(12) United States Patent
Dauber

(10) Patent No.: US 6,395,073 B1
(45) Date of Patent: May 28, 2002

(54) MULTI-FUNCTIONAL FILTER FOR REMOVING CONTAMINANTS FROM AN ENCLOSURE

(75) Inventor: Edwin Dauber, Chesapeake City, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 34 days.

(21) Appl. No.: 09/644,009

(22) Filed: Aug. 23, 2000

Related U.S. Application Data

(60) Provisional application No. 60/150,279, filed on Aug. 23, 1999.

(51) Int. Cl.[7] ............ B01D 53/04; B01D 46/10
(52) U.S. Cl. ............ 96/134; 96/147; 96/154; 55/385.6; 360/97.02
(58) Field of Search ............ 96/134–139, 147, 96/152–154; 55/385.1, 385.6, 502, 515, 519; 360/97.02–97.04

(56) References Cited

U.S. PATENT DOCUMENTS

| 3,953,566 | A | 4/1976 | Gore ............ 264/288 |
| 4,626,263 | A | 12/1986 | Inoue et al. ............ 55/155 |
| 4,633,349 | A | 12/1986 | Beck et al. ............ 360/97 |
| 4,830,643 | A | 5/1989 | Sassa et al. ............ 55/316 |
| 4,857,087 | A | 8/1989 | Bolton et al. ............ 55/385.6 |
| 4,863,499 | A | 9/1989 | Osendorf ............ 55/316 |
| 4,902,423 | A | 2/1990 | Bacino ............ 210/500.36 |
| 4,985,296 | A | 1/1991 | Mortimer, Jr. ............ 428/220 |
| 5,030,260 | A | 7/1991 | Beck et al. ............ 55/316 |
| 5,124,856 | A | 6/1992 | Brown et al. ............ 360/97.03 |
| 5,406,431 | A | 4/1995 | Beecroft ............ 360/97.02 |
| 5,417,743 | A | 5/1995 | Dauber ............ 96/13 |
| 5,447,695 | A | 9/1995 | Brown et al. ............ 422/171 |
| 5,500,038 | A | 3/1996 | Dauber et al. ............ 96/135 |
| 5,538,545 | A | 7/1996 | Dauber et al. ............ 96/153 |
| 5,593,482 | A | 1/1997 | Dauber et al. ............ 96/135 |
| 5,730,770 | A | * 3/1998 | Greisz ............ 55/385.6 |
| 5,869,009 | A | * 2/1999 | Bellefeuille et al. ............ 96/135 X |
| 5,876,487 | A | * 3/1999 | Dahlgren et al. ............ 96/135 X |
| 5,997,614 | A | * 12/1999 | Tuma et al. ............ 96/4 |
| 5,997,618 | A | * 12/1999 | Schneider et al. ............ 96/135 |
| 6,128,159 | A | * 10/2000 | Ino ............ 55/385.6 X |
| 6,146,446 | A | * 11/2000 | Tuma et al. ............ 96/135 X |
| 6,168,651 | B1 | * 1/2001 | Tuma et al. ............ 96/135 X |
| 6,214,070 | B1 | * 4/2001 | Crowder et al. ............ 55/385.6 X |
| 6,214,095 | B1 | * 4/2001 | Logan et al. ............ 96/147 |
| 6,238,467 | B1 | * 5/2001 | Azarian et al. ............ 96/139 X |
| 6,296,691 | B1 | * 10/2001 | Gidumal ............ 96/135 X |

FOREIGN PATENT DOCUMENTS

| WO | WO 91/14496 | 10/1991 |
| WO | WO 96/35499 | 11/1996 |
| WO | WO 99/04884 | 2/1999 |

* cited by examiner

Primary Examiner—Robert H. Spitzer
(74) Attorney, Agent, or Firm—Carol A. Lewis White

(57) ABSTRACT

The invention relates to a device for filtering contaminants, such as particulates and vapor phase contaminants, from a confined environment such as electronic or optical devices susceptible to contamination (e.g. computer disk drives) by incorporating multiple filtration functions into a unitary filter. Filtration functions include a combination of inlet, or breather, filter and recirculation filter. Moreover, adsorbent functions can be added to the filter depending on desired functionality within the enclosure.

30 Claims, 16 Drawing Sheets

MULTI-FUNCTIONAL FILTER FOR REMOVING CONTAMINANTS FROM AN ENCLOSURE

RELATED APPLICATIONS

The present application is a regular application based on U.S. Provisional Patent Application 60/150,279 filed Aug. 23, 1999.

FIELD OF THE INVENTION

This invention relates to a device for filtering contaminants, such as particulates and vapor phase contaminants, from a confined environment such as electronic or optical devices susceptible to contamination (e.g. computer disk drives) by incorporating multiple filtration functions into a single filter.

BACKGROUND OF THE INVENTION

Many enclosures that contain sensitive instrumentation must maintain very clean environments in order to operate properly. Examples include the following: enclosures with sensitive optical surfaces, or electronic connections that are sensitive to particulates and gaseous contaminants which can interfere with mechanical, optical, or electrical operation; data recording devices, such as computer hard disk drives that are sensitive to particles, organic vapors, and corrosive vapors; enclosures for processing, transport or storage of thin films and semiconductor wafers; and electronic control boxes such as those used in automobiles and industrial applications that can be sensitive to particles, moisture buildup, and corrosion as well as contamination from fluids and vapors. Contamination in such enclosures originates from both inside and outside the enclosures. For example, in computer hard drives, damage may result from external contaminates as well as from particles and outgassing generated from internal sources. The terms "hard drives" or "hard disk drives" or "disk drives" or "drives" will be used herein for convenience and are understood to include any of the enclosures mentioned above.

One serious contamination-related failure mechanism in computer disk drives is static friction or "stiction". Stiction results from the increased adhesion of a drive head to a disk while the disk is stationary plus increased viscous drag parallel to the head-disk interface. Newer high density disks are more sensitive to contamination-caused stiction because they are smoother and only thin layers of lubricants are present. Contaminants on the disk change the surface energy and the adhesive forces between the head and disk, which cause stiction. Also, vapors that condense in the gap between the head and disk can cause stiction. Further exacerbating these effects are the newer lower energy, lower torque motors being used in smaller disk drives for portable computers.

Another serious contamination-related failure mechanism in computer disk drives is head crashes. Head crashes can occur when particles get into the head disk interface. Newer high density drives have 30 nanometer or less flying heights or spacing between the head and disk during operation and typically have disks rotating 5400 revolutions per minute or greater. Even submicron-sized particles can be a problem, causing the head to crash into the particle or the disk after flying over a particle, bringing the drive to an abrupt failure mode. Particles can also adversely affect data integrity and mechanical a reliability of a drive, sometimes referred to as thermal asperity.

In addition, disk drives must be protected against a large number of contaminants in the surrounding environment that can penetrate the drive. This is true for drives used in small to medium sized computer systems which may not be used in the typical data processing environment and is especially true in drives that are removable and portable to any environment such as disk drives that are used in laptop computers or in Personal Computer Memory Card International Association (PCMCIA) slots.

Filtration devices to keep particles from entering these enclosures are well known. They may consist of a filtration media held in place by a housing of polycarbonate, acrylonitrile butadiene styrene (ABS), or some other material; or they may consist of a filtration media in the form of a self-adhesive disk utilizing a layer or layers of pressure sensitive adhesive. These devices are mounted and sealed over a vent hole in the enclosure to filter particulates from the air entering the drive. Filtration performance depends not only on the filter having a high filtration efficiency but also on having a low resistance to air flow so that unfiltered air does not leak into the enclosure through a gasket or seam instead of entering through the filter. Such filters work well for particulates of external origin, but do not address the problems from vapor phase contaminants.

Combination sorbent breather filters to keep particulates and vapors from entering enclosures are also well known. These can be made by filling a cartridge of polycarbonate, ABS, or similar material with sorbent and securing filter media on both ends of the cartridge. Examples of such filters are described in U.S. Pat. No. 4,863,499 issued to Osendorf (an anti-diffusion chemical breather assembly for disk drives with filter media having a layer impregnated with activated charcoal granules); U.S. Pat. No. 5,030,260 issued to Beck et al. (a disk drive breather filter including an assembly with an extended diffusion path); U.S. Pat. No. 5,124,856 issued to Brown et al. (a unitary filter medium with impregnated activated carbon filters to protect against organic and corrosive pollutants); and U.S. Pat. No. 5,447,695 issued to Brown et al. (Chemical Breather Filter Assembly). Unfortunately, many of these designs are too large and take up too much space in today's miniaturized drives. They again filter only incoming air of particles and mainly incoming air of vaporous contaminates, although some internal air can also be cleaned from internally generated vaporous contaminates since the filters are inside the drive and these contaminates will diffuse into the adsorbent sections of the filters. None of these filters address cleaning the air of internal particles.

A second combination adsorbent breather filter is also well known that encapsulates the adsorbent material such as an impregnated activated carbon polytetrafluoroethylene (PTFE) composite layer between two layers of filter media and is applied over a hole in the enclosure with a layer of pressure sensitive adhesive. These filters work well and are of a size that can be used in today's small drives but are typically designed to filter air coming into the drive. Thus, the adsorbent is typically primarily desired to adsorb both organic and corrosive vapors from the outside environment and will filter particulates only from air coming into or leaving the drive. Internally generated vapors can be adsorbed by these filters, but often times they are used in conjunction with another internal adsorbent so they can be smaller in size; therefore, such filters do not contain enough adsorbent to adequately adsorb all the internally generated contaminants. Again, particles are also generated inside the drive and are not typically captured by these filters.

A diffusion tube can be included with either the initial particulate breather filter or an adsorbent breather filter as described in U.S. Pat. No. 5,417,743 by Dauber. Diffusion tubes provide additional protection against vaporous contaminants (including moisture) entering the drive through the breather opening by providing a diffusion barrier in the form of the diffusion tube which creates a tortuous or a longer path for vaporous contaminants to diffuse through before entering the drive enclosure. Diffusion tubes reduce the number of contaminants reaching the interior of the enclosure (and/or the adsorbent depending on the location of the filter) and increase the humidity time constants or time required to reach humidity equilibrium with the environment. As used herein, for convenience, the term "diffusion tube" may refer to either a conventional tortuous path or it may refer to a non-tortuous cavity into which incoming air passes before entering the filter.

Internal particulate filters, or recirculation filters, are also well known. These filters are typically pieces of filter media, such as expanded PTFE membrane laminated to a polyester nonwoven backing material, or "pillow-shaped" filters containing electret (i.e., electrostatic) filter media. They are pressure fit into slots or "C" channels and are placed in the active air stream such as near the rotating disks in a computer hard disk drive or in front of a fan in electronic control cabinets, etc. Alternatively, the recirculation filter media can be framed in a plastic frame. These filters work well for particulate removal of internally generated particles but do not address the problem of vapor phase contaminants, nor do they provide ultimate protection from external particles entering the drive.

Internal adsorbent filters are also well known. One example is described in U.S. Pat. No. 4,830,643 issued to Sassa et al. This patent teaches a sorbent filter where a powdered, granular or beaded sorbent or sorbent mixture is encapsulated in an outer expanded PTFE tube. This filter is manufactured by W. L. Gore & Associates, Inc., Elkton, Md., and is commercially available under the trademark GORE-SORBER® module. While this is highly effective at collecting vapor phase contaminants, it is currently only available in large and medium sizes like filter volumes down to about 3 cc. In its present form, this filter is incapable of fully addressing the growing needs for even smaller and more compact sorbent filters, nor is it designed to filter the internal air of particulate contamination. A second well known internal adsorbent assembly incorporates a layer of adsorbent, such as activated carbon/PTFE composite, between an encapsulating filter layer and layer of pressure sensitive adhesive that helps encapsulate the adsorbent as well as provides a means of mounting the adsorbent assembly on an interior wall in the enclosure. Such a filter is described in U.S. Pat. No. 5,593,482 issued to Dauber et al, which also allows for an externally mounted adsorbent assembly with access to the enclosure interior. Again neither of these filters address particulate contaminates. A third internal adsorbent assembly incorporates a layer of adsorbent such as activated carbon/PTFE composite between two layers of filter media or is alternately wrapped in a layer of filter media and can be installed between slots or "C" channels much the way a recirculation filter is installed but without much real airflow through the filter. Such a filter is described in U.S. Pat. No. 5,500,038 issued to Dauber et al., and, as with the other filters mentioned, this construction does not provide significant particle capturing capability.

As stated above, all of these internal adsorbent filters work well at adsorbing vapor phase contaminants, but they do not filter particulates very well. They can collect particles by some impaction of particles onto the filter (i.e., by having the larger particles impacting or colliding with the adsorbent filter as particle-laden air speeds around the filters) or by diffusion of particles onto the filter. However, these filters do not perform nearly as well as standard recirculation filters that work by a combination of sieving (mechanically capturing particles too large to pass through the pore structure of the filter), impaction (capturing particle too large to follow the bending air streams around filters or the fibers of the filter), interception (capturing particles that tend to follow the air streams, but are large enough to still intercept a filter fiber or in other words those particles with a diameter equal to or greater than the distance between the fiber and the air stream line), and diffusion (capturing smaller particles buffeted about by air molecules in a random pattern and coming into contact with a filter fiber to become collected). These means of air filtration are much more rigorously described in a book entitled "Air Filtration" by R. C. Brown, published by Pergamon Press initially in 1993.

A commercially available adsorbent recirculation filter, available from The Donaldson Company, incorporates activated carbon beads glued to a nonwoven carrier that is sandwiched between two layers of electret filter material and two layers of plastic support screen. This filter provides some sorbent protection at the sacrifice of some internal particle filtration effectiveness, as this construction appears to increase resistance to air flow to the filter relative to a conventional recirculation filter. The sorbent capability is limited, however, due to, for example, the constraints of the filter size and the blockage of sorbent surface area by the glue holding the carbon to the carrier. Moreover, this filter does not filter particles from air entering the drive.

Another issue in today's drives is contamination due to corrosive ions such as chlorine and sulfur dioxide. To adsorb these compounds the adsorbent is typically treated with a salt to chemisorb the contaminants. When the filters described in the preceding paragraph were washed in deionized water, large amounts of these salts were released, making it unacceptable to today's sensitive disk drive environments. An alternative washable adsorbent recirculation filter is described in U.S. Pat. No. 5,538,545 issued to Dauber et al., wherein expanded PTFE membranes or other hydrophobic materials are used to encapsulate the adsorbent. However, these filters still do not filter air as it comes into the drive before it has had a chance to deposit particles and do damage to the drive.

Combinations of several filters having different functions in a single drive have been taught. For example, U.S. Pat. No. 5,406,431, to Beecroft, describes a filter system for a disk drive that includes an adsorbent breather and recirculation filter in specifically identified locations within the drive. Also, U.S. Pat. No. 4,633,349, by Beck et al., teaches a disk drive filter assembly comprising a dual media drum type filter element in a recirculating filter assembly that surrounds a breather filter. Further, U.S. Pat. No. 4,857,087, to Bolton et al., teaches incorporating a breather filter in a recirculation filter housing, but has significantly more parts and incorporates a third filter element complete with housings, aperatures, and gaskets to accomplish this inclusion. The combinations described in these patents either locate the filter components in separate regions of the disk drive or incorporate space-consuming fixtures to orient the component parts within the drives.

As disk drives have become smaller and the prices have declined, there has been a push for simplification and the reduction in the number of parts in a drive to reduce cost and improve performance. Also, as the drives continue to increase in recording data density and capacity, they continue to become more sensitive to particulate and vaporous contamination, such that the existing filtration means often do not meet these ever more demanding filtration requirements.

Accordingly, a primary purpose of the present invention is to provide a new, improved multiple function part that can filter both incoming (external) air and internal recirculating air of particulates.

A further purpose of the present invention is to provide an improved multiple function part that can filter both incoming and internal recirculating air of both particulates and vapor phase contaminants.

A further purpose of the present invention is to provide a multiple function part, as described above, which further incorporates a diffusion tube.

A further purpose of the present invention is to provide a multiple function part, as described above, which further incorporates a gasket to help to seal the disk drive housing.

SUMMARY OF THE INVENTION

The present invention is a unitary filter that serves multiple filtration functions within the disk drive. In a first embodiment, the filter incorporates a combination of inlet, or breather, filter and recirculation filter. Alternatively, the filter may incorporate a breather filter, a recirculation filter and a sorbent filter, the sorbent filter providing either active filtration (i.e., air is directed through the adsorbent component as it enters the disk drive through the breather hole or air is directed through the adsorbent component as air is recirculated around the drive) or passive filtration (i.e., air within the disk drive passes along the adsorbent component which is adjacent the normal air flow path in the drive, with no air being specifically directed through a cross-section of the adsorbent) or some combination of the two. Further, a diffusion tube could be included in the filter, or alternatively in a location on the drive housing where the filter is positioned, to provide a combined multi-functional or "all-in-one" filter assembly which has all of the filtration components which are typically contained in a conventional disk drive. Still further, the multi-functional filter could incorporate a gasket that would still further reduce the components required for assembling finished disk drives.

Not only are the filters of the present invention simple to use and install, but another advantage of such a device is that the filter is low in outgassing and nonvolatile residues as well as low in particulation. In addition, depending on the construction, the filters can have the added benefit that they can be washed with deionized water to remove surface ionic contamination and particulation to improve their suitability for those applications requiring such cleanliness such as in computer disk drives without washing out beneficial treatments such as salts which remove acid gases from the air streams. This washability is accomplished by using hydrophobic filter materials (along with impermeable layers such as adhesives, etc.) to surround the adsorbent layers. "Hydrophobic" as used in this application means the filter materials have a water (or water with surfactant if one is used) entry pressure sufficient to withstand the conditions of conventional washing steps, such as heating, stirring, ultrasonics, etc.

The filter may comprise a layer or layers of adhesive to adhere the filter to the proper location on the interior or exterior of the drive enclosure wall. The filter may optionally cover an inlet diffusion tube groove in the drive housing, or the filter may optionally fully contain the diffusion tube. A layer or layers of filter media are provided in substantially laminar relation to the adhesive to filter the incoming and recirculating air of particles. A layer or layers of adsorbent media may optionally be provided between the adhesive and filter layers, or between filter media layers, to filter one or both of the incoming and recirculating air streams of vaporous contaminants. Appropriate partitioning of the filter is provided to permit flow channels for inlet air and for recirculating air without the possibility of allowing unfiltered inlet air through the filter.

The present invention consolidates filtration functions which were previously performed by two, three, or more filters into a single filter that functions well, is easy to install, is clean and cleanable. Additionally, further components, such as a gasket or gasket(s) or vibration dampening materials, can be included to further reduce the number of components required for final assembly.

In summary, the present invention provides a compact, clean, low outgassing (i.e., typically less than 20,000 ng/g at 85° C. for four hours), low particulating (i.e., typically less than (50) one hundred micron sized particle per square centimeter when tested with a liquid particle counter), unitary breather/recirculation filter that can optionally contain adsorbents and also, optionally, can be washable, particularly if the filter comprises hydrophobic PTFE membranes. The invention can utilize any suitable adsorbent type and be tailored for preferential performance in filtering of air from both internal and external sources for particles as well as hazardous vapor contaminants. As a unitary filter, the multi-functional filter minimizes installation time, as compared to the use of several conventional parts to achieve the required filtration and adsorption. The filter can further be combined with an optional diffusion tube to improve the performance of the breather component. The filter can still further be combined with a gasket to provide a means of sealing the disk drive. The multi-functional filters of the present invention can be used in filters where air is driven by normal convection, by diffusion means, by an auxiliary fan, or some combination thereof.

BRIEF DESCRIPTION OF THE DRAWINGS

The operation of the present invention should become apparent from the following description when considered in conjunction with the following drawings, in which.

DETAILED DESCRIPTION OF THE INVENTION

Figure 1:
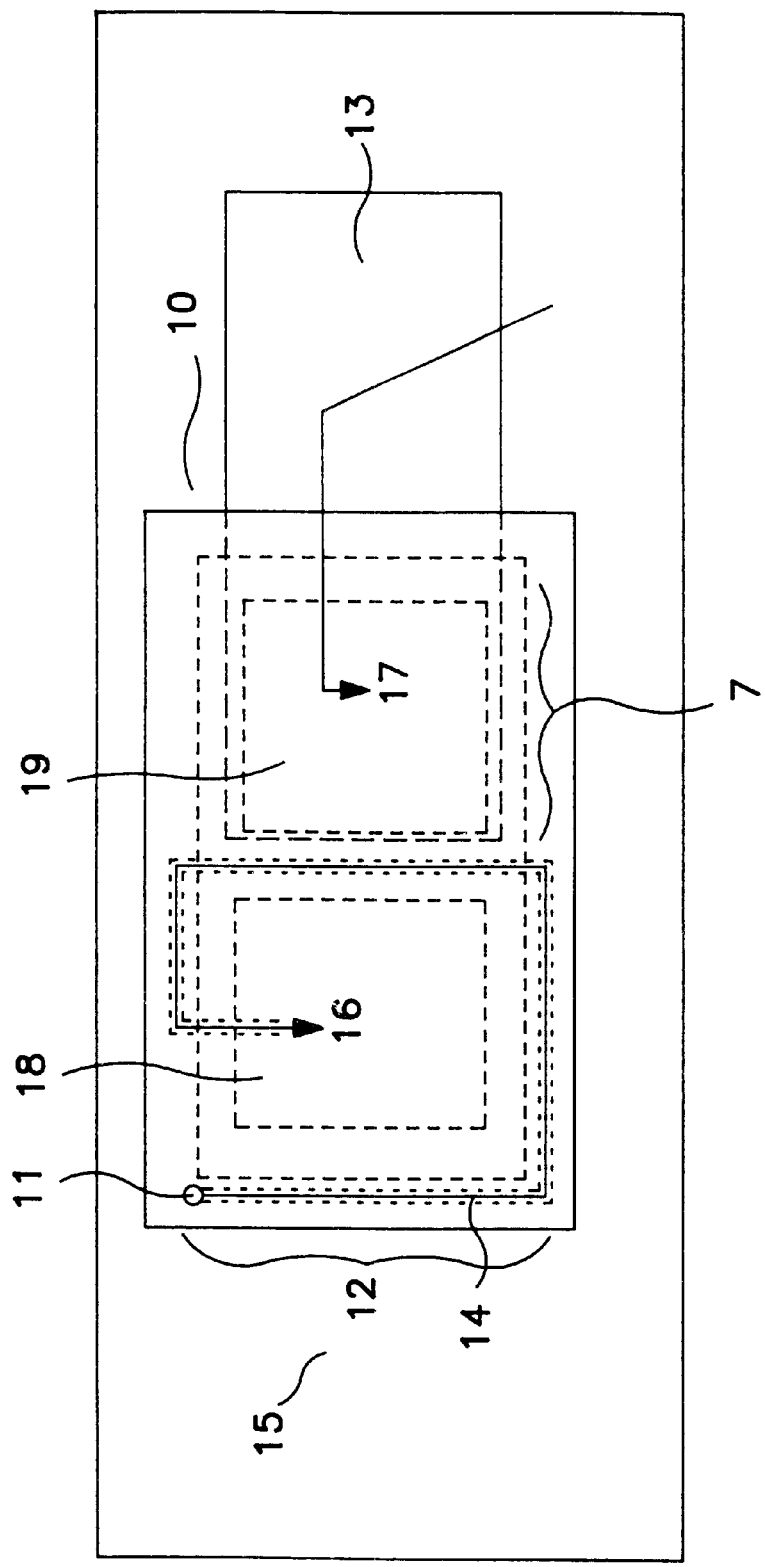
FIG. 1 is a top view of an embodiment of the filter unit 10 of the present invention as it would be located on a drive housing.

Referring to FIG. 1, there is shown a top perspective view of a first embodiment of the multi-functional filter assembly 10 of the present invention as it would appear looking down on the filter mounted to an interior wall of a drive enclosure housing 15. The direction of air flow through the filter is indicated by arrows showing the two air stream paths, the first stream 16 coming from outside the enclosure through a breather vent hole 11, and along a diffusion path 14 into the breather component of the filter, designated generally as 12, and the second stream 17 of recirculating air within the enclosure as air is channeled through the recirculation component of the filter, designated generally as 7, with the aid of an optional ramp or channel 13 designed, for example, into the enclosure housing. As used herein, the terms "ramp" and "channel" shall refer to any geometry or mechanism within the drive housing which selectively directs air flow toward the multi-functional filter. FIG. 1 shows in broken line perspective view separate adsorbent layers 18 and 19 over the breather and recirculation components 12 and 7, respectively. Each adsorbent can be tailored for composition, flow rate through the filter, etc., depending on the desired performance. For example, the adsorbent for the breather path may be treated to adsorb acid gases such as $SO_2$, $NO_2$, etc., from the environmental air, while the adsorbent for the recirculation flow path may be tailored to adsorb contaminants which are more troublesome from an outgassing perspective, such as sebacates from the motors or antioxidants from plastics.

Figure 2:
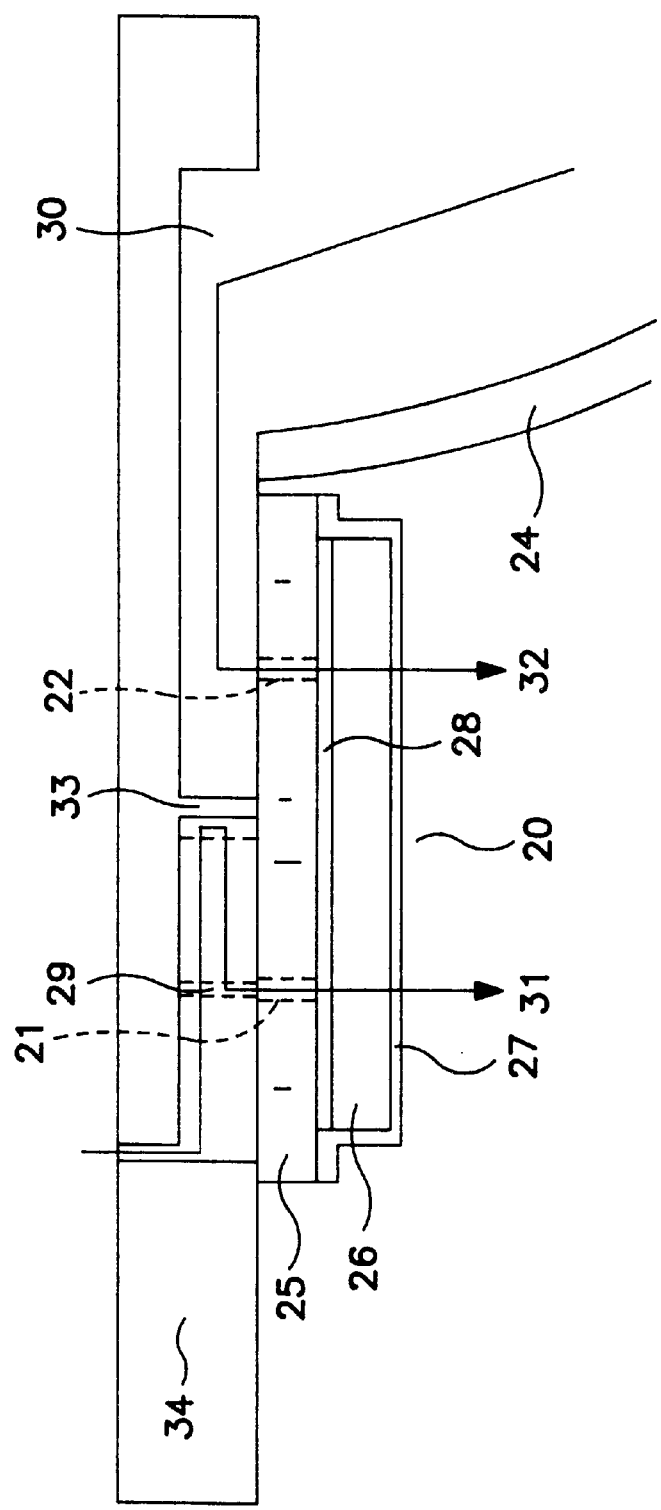
FIG. 2 is a side cross-sectional view of an embodiment of the filter unit 20 of the present invention as it would appear on the enclosure housing.

FIG. 2 shows a side cross-sectional view of another embodiment of a filter assembly 20 of the present invention as it would appear mounted on a disk drive enclosure housing 34. The two air stream paths are indicated as 31 and 32, the air stream 31 coming from outside the housing 34 through a diffusion path 29, and air stream 32 recirculating air within the enclosure as air is channeled up ramp 24 into chamber 30. Chamber 30 is separated from the diffusion path 29 by a rail or separator 33 such that air cannot enter the drive through diffusion path 29 and proceed unfiltered down ramp 24. The adhesive layer 25 mounts the filter 20 to the housing 34 and has holes 21 and 22 (represented by dotted lines) to allow the air streams 31 and 32 through the adhesive layer. Layer 27 is the filter media. Layer 26 is the adsorbent layer. In this embodiment, the adsorbent layer 26 is a single adsorbent layer covering both air stream paths 31 and 32 as shown in FIG. 2. This construction typically provides the largest internal passive adsorbent area per unit filter area. Layer 28 is a second filter media located such that the filter media layers 27 and 28 totally encapsulate the adsorbent 26. Such a construction is desirable for adsorbents which may particulate because the filter layers 27 and 28 prevent such particulation from entering the enclosure. Moreover, by providing filter layers 27 and 28 which are hydrophobic, the filter becomes washable.

Figure 3:
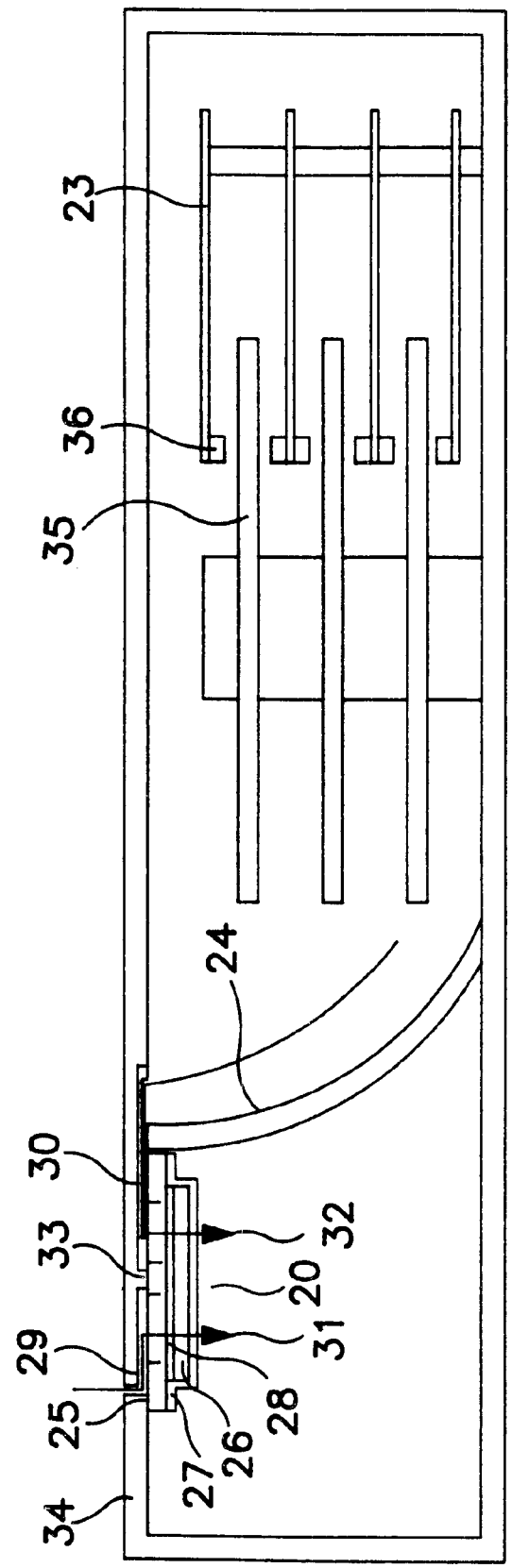
FIG. 3 is a side view of a computer hard disk drive showing an embodiment of the filter unit 20 of the present invention installed therein.

FIG. 3 shows additional features of a computer hard disk drive into which the filter element of FIG. 2 has been incorporated, whereby additional components typically present within a drive are shown, such as the rotating magnetic recording disks 35, the read/write heads 36 and the armatures 23 for moving the heads. The rotating disks 35 are the driving force for circulating, or recirculating, air within the disk drive. This implies that the best place to locate the ramp 24, and hence the filter 20, is near the disks such that as air is moved by the disks it is driven up the ramp 24 and through the filter 20 along air stream path 32 to effectively filter the internal air.

Figure 4A:
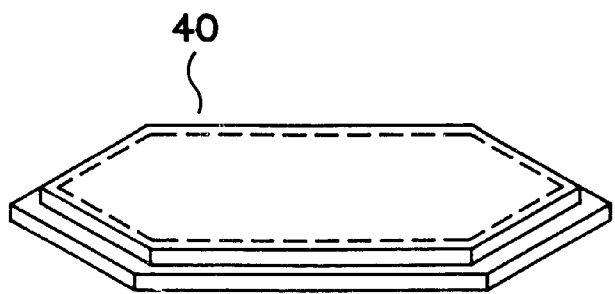
FIGS. 4A, 4B and 4C are top, side cross-sectional and isometric views, respectively, of an embodiment of the filter unit 40 of the present invention according to Example 2.
Figure 4B:
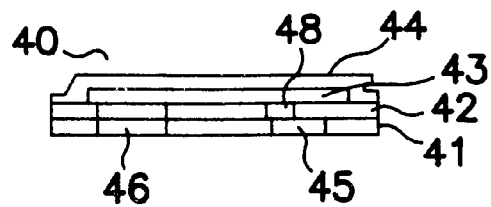
Figure 4C:
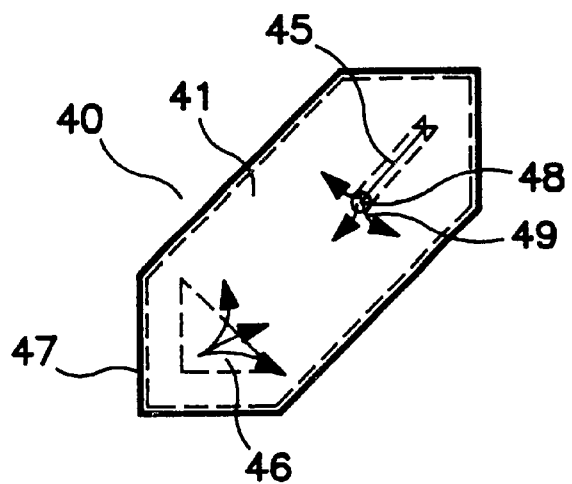

FIGS. 4A, 4B and 4C show different perspective views of another multi-functional filter of the present invention. As shown in FIG. 4C, the filter 40 comprises a layer 41 of adhesive with holes 45 and 46 cut through it. As seen in FIG. 4B, superimposed on layer 41 is a layer 42, which is a second adhesive layer having a non-adhesive side next to layer 41. Holes 46 and 48 are cut through layer 42 (hole 46 is actually a common hole through layers 41 and 42). Hole 48 aligns with one end portion of hole 45, such that when the other end of hole 45 is placed over a hole in the disk drive housing, air will enter the drive housing through the enclosure hole, pass along hole 45 to hole 48 and enter into the drive along path 49, shown in FIG. 4C. Recirculating air can be optionally guided with a ramp or other mechanism, as previously mentioned, into the chamber under hole 46 and up through hole 46 along path 47. Layer 43 is an adsorbent layer. Layer 44 is a filtration layer which covers the adsorbent layer and is adhered to the adhesive layer 42. It should be apparent to one of skill in the art that the adhesive may comprise a pressure sensitive adhesive layer, a double-sided adhesive tape on a backer material or multiple sided adhesive on multiple backers, depending on the desired construction of the filter. The adhesive may also comprise a heat sensitive or UV or other curable adhesive layer.

Figure 5A:
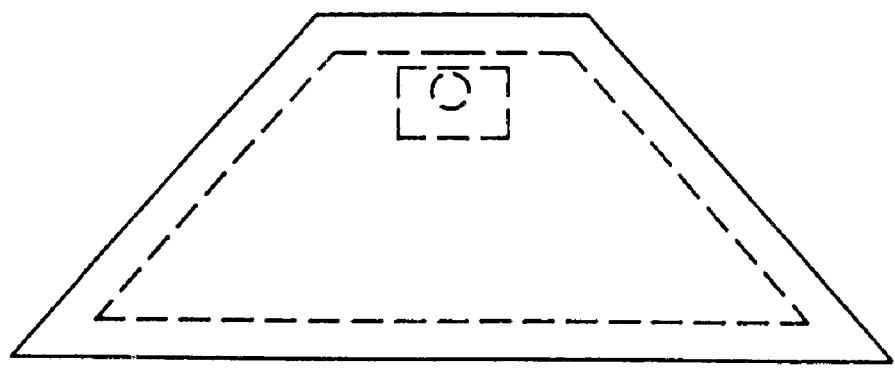
FIGS. 5A and 5B are top perspective and side cross-sectional views, respectively, of an embodiment of the filter unit 50 of the present invention.
Figure 5B:
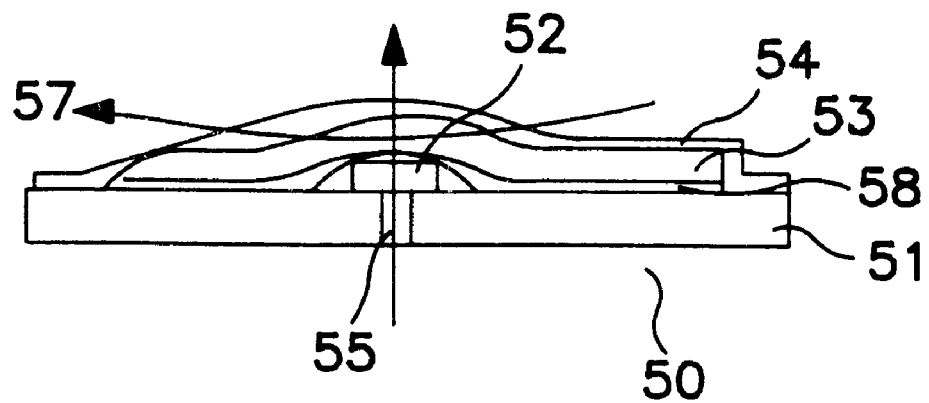

FIGS. 5A and 5B show top perspective and side cross-sectional views, respectively, of another embodiment of the filter assembly 50 comprising a dual function breather/recirculation filter. Layer 51 is the adhesive layer with hole 55 that would be mounted over a hole in the disk drive enclosure. Layer 52 is a first filter layer and layer 53 is a fibrous filter of some depth covering the hole 55 as well as having some length and width, the combination of layers 53 and 52 providing filtration of incoming air noted by the arrow as air stream 56. Layer 54 is a cover scrim that contains any fibers in layer 53 from protruding or coming loose. Layer 58 is an non-woven scrim layer. Recirculating air passes through the depth of the filter layer 53 along path 57 and is thereby cleaned and filtered. In an alternative embodiment, this filter could also include optional adsorbent layers, but as shown here the filter provides total particulate filtration of both incoming and internal air.

Figure 6:
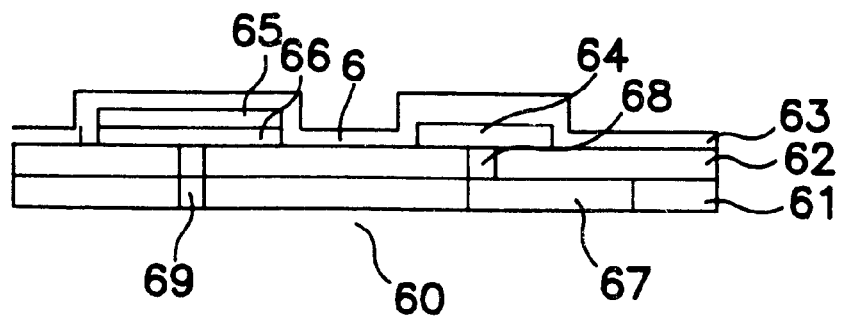
FIG. 6 is a side cross-sectional view of an embodiment of the filter unit 60 of the present invention.

FIG. 6 shows a side perspective view of an embodiment similar to that shown in FIG. 1, with the filter assembly 60. Layer 61 is an adhesive layer with holes 67 and 69 cut through it. Another adhesive layer 62 is superimposed on layer 61 with a corresponding hole superimposed over and continuous with hole 69 as well as hole 68 which is superimposed over the one end portion of hole 67. Layer 65 is an adsorbent layer tailored for collecting undesirable contaminants within the drive for the recirculation filter, and adsorbent layer 64 is tailored for collecting undesirable contaminants from the external air which enters the drive in the breather filter portion of the filter. Layer 66 is a further filter layer in the recirculation portion of the filter which assists in insuring that adsorbent particles won't pass out of the filter into the drive. Layer 63 is the filter layer which is oriented to cover both the breather portion and the recirculation portion of the multi-functional filter with a separating section 6 which is adhered to the adhesive layer 62. The filter is preferably positioned over a breather vent hole in a disk drive housing so that incoming air to the drive will pass through into hole 67 in the region opposite hole 68, then pass horizontally along hole 67 then through hole 68, adsorbent layer 64, and filter layer 63. Moreover, the recirculating portion of the filter is preferably located over a channel or cavity in the disk drive housing so that recirculating air will pass into the cavity under hole 69 and pass through hole 69, filter layer 66, adsorbent layer 65, and filter layer 63, thereby filtering the recirculating air of particulates and contaminants.

Figure 7:
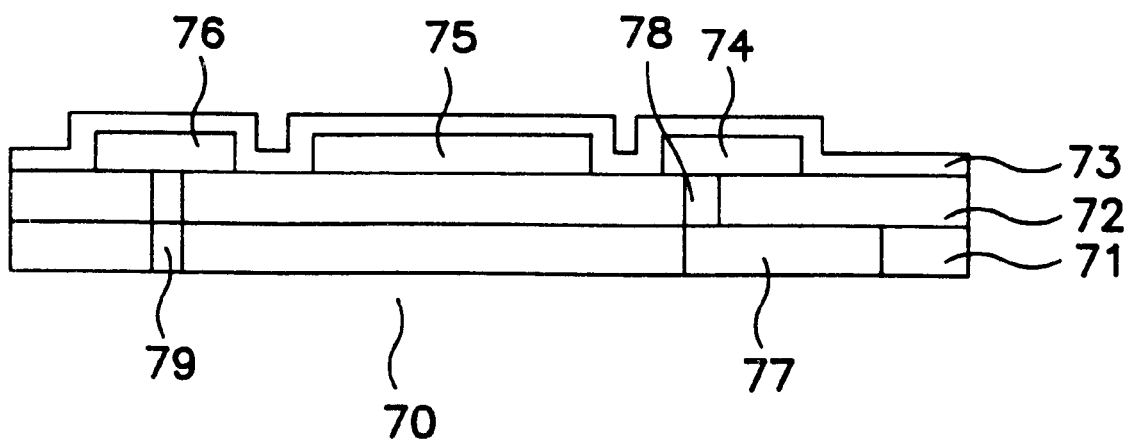
FIG. 7 is a side cross-sectional view of an embodiment of the filter unit 70 of the present invention.

FIG. 7 shows a side cross-sectional view of another embodiment of a filter assembly 70. Layer 71 is an adhesive layer with holes 77 and 79 cut through it. Layer 72 is a second adhesive layer superimposed over layer 71 with a hole superimposed over and aligned with hole 79 in layer 71 and hole 78 superimposed over one end portion of hole 77. Layer 76 is an adsorbent layer tailored to collect contaminants which are present in the recirculating air in the air recirculation portion of the filter. Layer 74 is an adsorbent layer tailored to collect contaminants which are present in the external air in the air breather portion of the filter. Layer 75 is an additional adsorbent layer that functions as a passive, adsorptive component of the filter for filtering air within the disk drive. Layer 73 is a filter layer that covers adsorbent layers 74, 75 and 76 and which is adhered to the adhesive layer 72 at several points, as shown. By providing additional adsorbent layers, this embodiment allows for tailoring of the adsorbent layers to solve specific internal drive outgassing problems.

Figure 8:
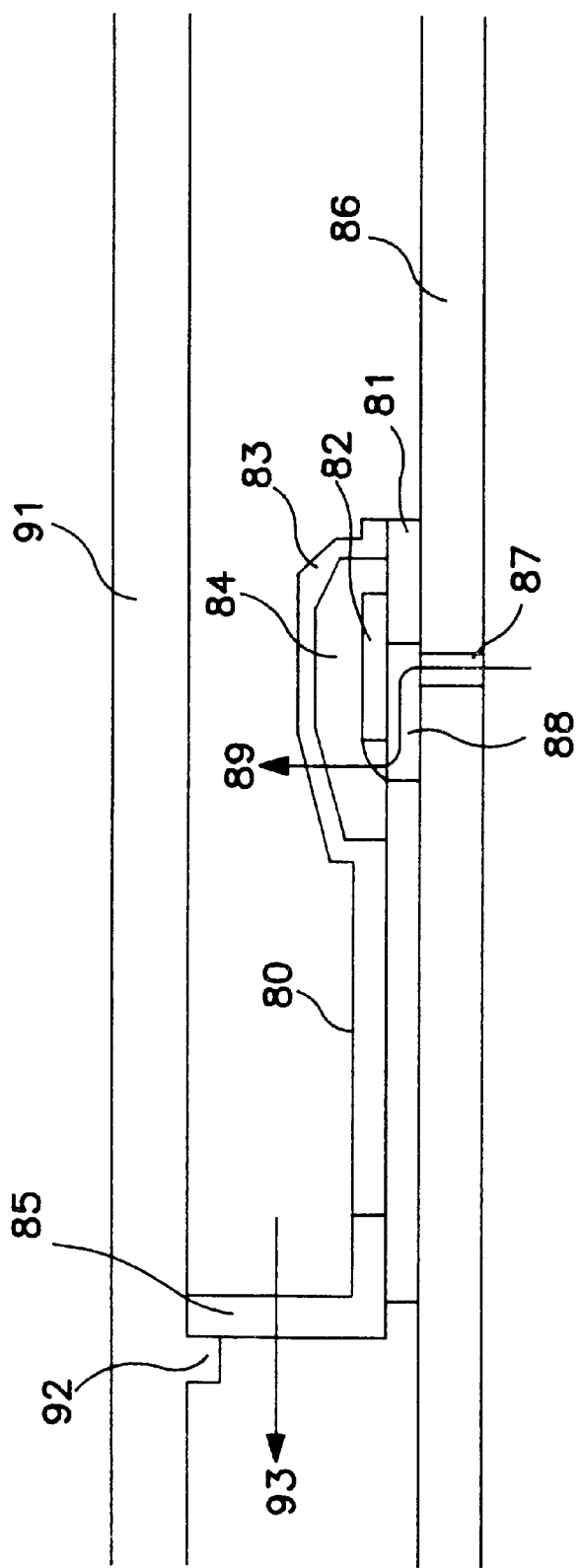
FIG. 8 is a side cross-sectional view of a filter unit 80 embodiment of the present invention located within a disk drive enclosure, or housing.

FIG. 8 shows a side cross-sectional view of a further embodiment of a filter assembly 80 as installed in an enclosure having enclosure walls 86 and 91. Layer 81 is an adhesive with a hole 88 cut into it, the adhesive adhering the filter 80 to the enclosure wall 86, which could be a top, bottom or side wall of the enclosure, and the hole 88 being superimposed over the hole 87 through the enclosure wall. Layer 82 is an impermeable layer adjacent and partially covering the hole 88, which forms a diffusion channel between the housing wall 86, the adhesive sides around hole 88 and the layer 82. Layer 84 is an adsorbent layer for filtering air entering the drive through the hole and also acts as a passive adsorbent for filtering contaminants in the internal air. Filter layer 83 covers the adsorbent layer and is adhered to the adhesive layer. The component layer 85 also comprises a filter which is adhered to adhesive layer 81. Alternatively, this layer may be adhered to the filter by other techniques, such as by sonic or heat welding or with a curable adhesive. In this embodiment, layer 85 is curved or folded at some angle relative to the plane of the remainder of the filter element and to the plane of the enclosure wall 86 to allow more recirculating air to pass into the filter layer than would otherwise flow therethrough if it were in a planar orientation to the wall. The filter may extend into only a portion of the space between the walls 86 and 91, or it may extend all the way to another wall 91 (e.g., the opposite wall). The recirculating filter layer 85 may contact a retaining post 92 extending from the wall 91 by the force of the air flow through the filter, or the layer 85 may be adhered to the post 92, thereby providing support to the filter layer 85. The filter component layer 85 may optionally be continuous with the filter layer 83. The incoming air flow path is along the path indicated by arrow 89, and the recirculation air flow path is along the path indicated by arrow 93. Layer 85 could also optionally incorporate an adsorbent or an adsorbent layer could be placed adjacent the layer 85 to provide an adsorbent function in combination with the recirculation function.

Figure 9A:
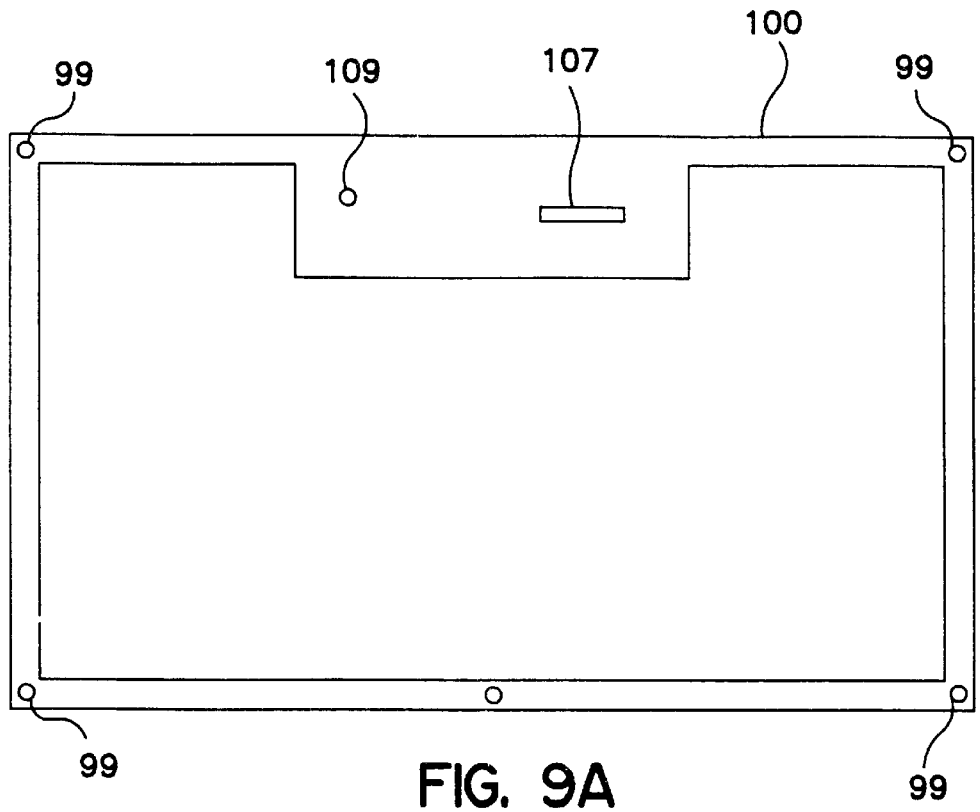
FIGS. 9A and 9B are top perspective and side cross-sectional views of an embodiment of the filter unit 90 of the present invention incorporating a gasket with the filter element.
Figure 9B:
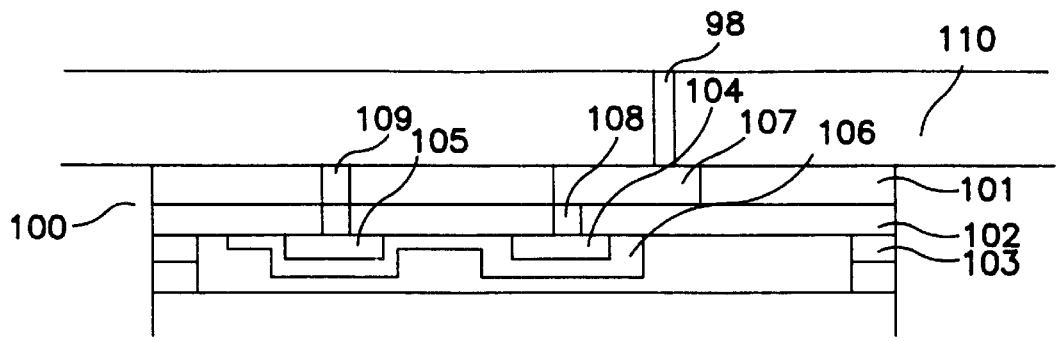

FIGS. 9A and 9B show a top view and a side cross-sectional view, respectively, of a further exemplary embodiment of a filter assembly 100 of the present invention, wherein this filter assembly also incorporates a gasket function in the multi-functional filter. Referring to FIG. 9A, filter assembly 100 can mount by mounting holes 99 which align with mounting screws in the disk drive housing (not shown) to a cover or bottom of an enclosure. Referring to FIG. 9B, layer 101 is an adhesive layer with holes 107 and 109 cut through it for mounting the filter assembly over an opening 98 in a drive housing 110. Layer 102 is a second adhesive layer superimposed on layer 101 with a hole aligned with and superimposed over hole 109 in layer 101, and hole 108 superimposed over an end portion of hole 107. Layer 104 is an adsorbent layer tailored for the adsorbent breather filter function. Layer 105 is an adsorbent tailored for the adsorbent recirculation filter function. Layer 106 is a filter layer adapted to cover both adsorbent layers 105 and 104. Layer 103 is a gasket material for sealing the disk drive enclosure when the disk drive housing is assembled to the opposite housing component 97 (e.g., if the filter assembly is attached to the bottom of the drive housing 110, then gasket material seals between the top (97) and bottom (110) portions).

Figure 10:
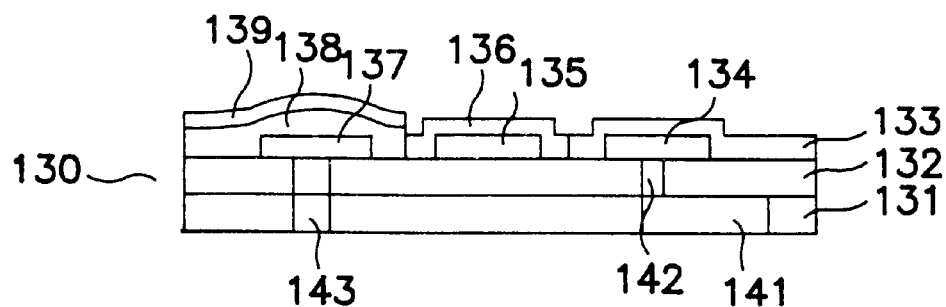
FIG. 10 is a side cross-sectional view of another embodiment of the filter unit 130 of the present invention.

FIG. 10 is a side cross-sectional view of another embodiment of a filter assembly 130 of the present invention that allows tailoring of filtration and adsorbent layers to optimize the performance of each filter portion. Layer 131 is an adhesive layer with holes 141 and 143 cut into it. Layer 132 is another adhesive layer superimposed over layer 131 with a hole cut into it which is aligned with and superimposed over hole 143, and another hole 142 which is superimposed over the one end portion of hole 141. Layer 134 is an adsorbent layer superimposed over the holes 141 and 142 and with a composition which may be optimized for the adsorbent breather filter application. Layer 133 is a filter layer which covers adsorbent layer 134 and is adhered to adhesive layer 132, the filter layer being optimized for the adsorbent breather filter application. Layer 135 is another adsorbent layer optimized for passive adsorption in the disk drive. Layer 136 is a filter layer which covers adsorbent layer 135, the filter layer being optimized for the passive adsorbent application. Layer 137 is another adsorbent layer optimized for adsorbent recirculation. Layer 138 is a filter layer which covers adsorbent layer 137, the filter layer being optimized for the adsorbent recirculation filter application. Layer 139 is a scrim layer to constrain any fiber from the filter layer 138, particularly if it is a fibrous filter layer such as an electret media, as discussed in more detail later.

Figure 11:
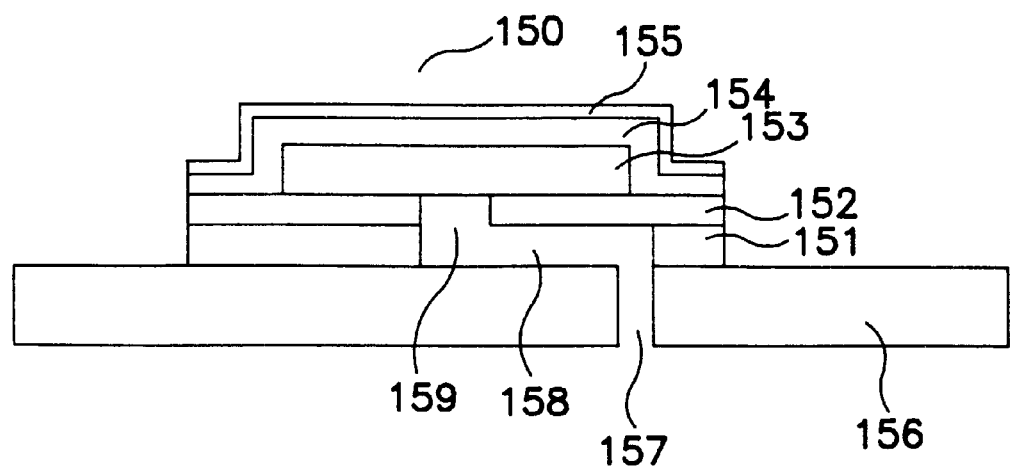
FIG. 11 is a side cross-sectional view of another embodiment of a filter 150 of the present invention.

FIG. 11 shows a side cross-sectional view of a further embodiment of a filter assembly 150 of the present invention. Layer 151 is an adhesive layer with hole 158 cut into it that will be aligned at one end with a hole 157 in the disk drive enclosure wall 156. Layer 152 is another adhesive layer superimposed over layer 151 with hole 159 cut through it and superimposed over the end portion of hole 158 which is opposite the end that is aligned over hole 157. Layer 153 is an adsorbent layer superimposed over hole 159 and over the end portion of hole 158 which is opposite the end that is aligned over hole 157. Layer 153 is an adsorbent layer superimposed over hole 159 and extending further over part of layer 152. Layer 154 is a filter layer, such as of a higher efficiency membrane for good breather filtration efficiency, which covers adsorbent layer 153 and is adhered to adhesive layer 152. Layer 155 is another filter layer which covers the filter layer 154, such as a fibrous, electret material for good recirculation filter effectiveness.

In the embodiments described and illustrated, the first adhesive layer may be either a single layer of transferable adhesive or a double-sided adhesive coated onto a carrier or substrate such as polyester or polypropylene. A preferred adhesive utilizes a high peel strength of greater than 30 ounces/inch as measured by PSTC #1 (Pressure Sensitive Tape Council), low outgassing of less than 0.1% collected volatile condensable material (CVCM) as measured by ASTM-E595-84, solvent-free non-particulating permanent acrylic pressure sensitive adhesive. A double-sided adhesive tape may also be preferred for certain constructions because it is easier to handle, and the substrate adds support and rigidity to the filter construction. A commercially available adhesive satisfying these requirements is 3M 444 adhesive, available from Minnesota Mining & Manufacturing in Minneapolis, Minn. Other adhesives, such as UV curable adhesives, etc. are also suitable. Furthermore, if a diffusion tube is desired, adhesives as described in U.S. Pat. No. 5,417,743 can be used. For example in many of the examples illustrated above incorporating a diffusion tube, a second adhesive layer is superimposed over the first. This second layer could again be just adhesive, but a single-sided (i.e., adhesive on one side of a carrier or substrate) or double-sided adhesive is preferred for ease in handling and processing.

Prior to attachment to the disk drive housing, the exposed adhesive layers may have one or more release liners adhered thereto to protect the adhesive and to facilitate handling of the filters. The release liners would be removed prior to assembly of the filter onto the disk drive enclosure.

The adsorbent may comprise one or more layers of 100% adsorbent materials, such as granular activated carbon, woven or nonwoven carbon fibers, or may be a filled product matrix such as a scaffold of porous polymeric material compounded with adsorbents that fill the void spaces. Other possibilities include adsorbent impregnated nonwovens or beads on a scrim where the non-woven or scrim may be cellulose or polymeric and may include latex or other binders as well as porous castings or tablets of adsorbents and fillers that are polymeric or ceramic. The adsorbent can also be a mixture of different types of adsorbents.

Examples of adsorbent materials that may be contained within the adsorbent layer include: physisorbers (e.g. silica gel, activated carbon, activated alumina, molecular sieves, etc.); chemisorbers (e.g. potassium permanganate, potassium carbonate, potassium iodide, calcium carbonate, calcium sulfate, sodium carbonate, sodium hydroxide, calcium hydroxide, powdered metals or other reactants for scavenging gas phase contaminants); as well as mixtures of these materials. For some applications, it may be desirable to employ multiple layers of adsorbent materials, with each layer containing different adsorbents to selectively remove different contaminants as they pass through the filter.

A preferred embodiment of the adsorbent layer utilizes a sorbent filled PTFE sheet wherein the sorbent particles are entrapped within the reticular PTFE structure as taught by U.S. Pat. No. 4,985,296 issued to Mortimer, Jr. and specifically incorporated herein by reference. Ideally, particles are packed in a multi-modal (e.g. bi-modal or tri-modal) manner with particles of different sizes interspersed around one another to fill as much of the available void space between particles as is possible, so as to maximize the amount of active material contained in the core. This technique also allows a number of sorbents to be filled into a single layer. The core can then be expanded to allow some airflow or needled to allow more airflow. Expanding the core reduces loading density but offers a more uniform sorbent barrier. Other processing, such as needling or the like, may be desirable to obtain the desired adsorbent performance.

Using PTFE membranes as a filter material over the adsorbent layers imparts a number of additional advantages to this improved filter construction. PTFE is hydrophobic. Some adsorbents used in industry use a water-soluble salt to impregnate a physical adsorbent such as activated carbon to provide a chemical adsorbent with a large active surface area. By covering the carbon layer with the PTFE membrane, it makes the final part waterproof so that deionized water can come into contact with the part and not penetrate the adsorbent. Thus, the salt treatment is not susceptible to removal by water washing. Ionic contamination has become a big concern for corrosion susceptible apparatus such as computer disk drives. Ions of concern, such as chlorine and sulfur dioxide, are readily soluble in water, and thus a deionized water wash has become routine for many components used within the drive. Thus, embodiments utilizing PTFE filter layers to encapsulate the adsorbent allow use of water soluble salt treated adsorbents incorporated into the adsorbent layer and can withstand washing without loss of adsorbent treatment and effectiveness.

While these PTFE membranes as mentioned above are hydrophobic and can be washed, they also have a high moisture vapor transmission rate, which allows contaminants in the air to quickly and easily diffuse through the membranes into the adsorbents. They can also be made with very good filtration efficiencies which is especially good for the breather filter and adsorbent breather filter function such as layer 154 in FIG. 11. An example of a preferred membrane for that would be one made in accordance with U.S. Pat. No. 3,953,566 with an efficiency of 99.97% at 0.3 microns sized particles and a permeability or face velocity of 7 cubic feet/minute/meter square at 0.5 inches of water pressure, or a Frazier number of 7. Such membranes are commercially available in finished filter form from W. L. Gore and Associates, Inc.

Additionally, PTFE is a non-linting, non-outgassing inert binder that can be used as the adsorbent binder by mechanically entrapping the adsorbent particles within the PTFE material, effectively reducing dusting of adsorbent material during the manufacture and during the life of the filter. This material can also be made in a relatively thin, highly loaded material per U.S. Pat. No. 4,985,296 that can allow thin final constructions with high adsorbent content. The PTFE/adsorbent composite can easily be made in thicknesses from less than 0.001" to 0.400" and greater allowing a great deal of flexibility in finished filter thicknesses and adsorbent loading. Additionally, sorbent densities approximating 80–90% of full density are possible with multi-model packing and physical compression, so that maximum adsorbent material can be packed per unit volume. The use of PTFE as the binding element also does not block the adsorbent pores as do binders such as acrylics, melted plastic resins, etc.

As previously mentioned, PTFE membrane filter materials can be used to cover the adsorbent material and act as filtration membranes. One such preferred filter media to encapsulate the adsorbent layer is a layer of expanded PTFE membrane made in accordance to U.S. Pat. No. 4,902,423 issued to Bacino et al. incorporated by reference. This filter media may optionally be structurally supported by a layer of woven, nonwoven, or expanded porous material, such as polyester, polypropylene, polyamide, etc. This filter media has several advantages. It can be made very highly permeable, with resistances to air flow of less than 0.5 mm H2O @ 10.5 feet per minute (3.2 meters per minute), equivalent to a Frazier number of about 250, and still contain adsorbent particulate within the filter.

The particle filtration efficiency of this highly expanded membrane as measured on a TSI 8160 efficiency test rig available from TSI Inc., in Minnesota, is also very good (e.g. in excess of 55% at 0.3 µm) which provides good particle filtration along with the adsorbent containment. A preferred support layer is a Reemay 2014 polyester nonwoven, 1.0 oz/yd2 available from Reemay, Inc., Old Hickory, Tenn.

A second preferred filter media to encapsulate at least the adsorbent layer, and more preferably to be used in both the recirculation filter and adsorbent recirculation filter applications, is a layer of an electrostatic triboelectret material available in finished filter form from W. L. Gore and Associates, Inc. under the trademark GORE-TRET® recirculation filters. An illustrated example of this would be layer 155 in FIG. 11 or layer 53 in FIG. 5B. Advantages of this media are that it is very high in efficiency (e.g., in excess of 90% @0.3 micron) and also very permeable (e.g., less than 1 mm $H_2O$ at 10.5 fpm or 3.2 m/min), equivalent to a Frazier number of greater than about 125. While this media loses its charge while being washed with deionized water, it immediately regains its efficiency upon drying due to the triboelectric effect of the mix of dissimilar fibers.

Other filter materials can also be used. They could be electret or other triboelectret materials that yield high efficiencies and low resistances to airflow. They could also be other filter papers or filter membranes such as polypropylene membranes or cast polymeric membranes or some combination of filter materials. Different filter materials with different properties can be used in the different sections of the filter as illustrated in FIG. 10, to optimize the low resistance requirement of the recirculation filter section with air permeabilities typically in the range of 18 to 1000 Frazier, preferably in the range of 60 to 250 Frazier, a higher efficient higher resistance breather filter function of the breather section, with air permeabilities typically in the range of 0.05 to 40 Frazier, and preferably from 0.1 to 7 Frazier, and also optimize the adsorbent containment and vapor transmission in a passive adsorbent section, with air permeabilities typically in the range of 0.05 to 1000 Frazier, and preferably in the range of 7 to 250 Frazier.

An outer protective layer or layers can also be used to add durability to the filter and to contain any protruding fibers from either the triboelectret type filter media or the filter support media for the membrane filter media. Typically, this would be an extruded or expanded plastic material such as polypropylene, polyethylene, polyamide, polyester, etc. A preferred material is a Delnet 0707 expanded polypropylene material available from Applied Extrusion Technology, Inc., Middletown, Del.

TEST PROCEDURES

Assembly of the Device into a Modified Drive:

An example of the present invention was tested for adsorption and particulate filtration performance using a modified version of a commercially available 3.5 inch form factor disk drive (Model Number 90845D4, Maxtor Corporation, Milpitas, Calif.). All drive components except the motor were removed prior to modification of the drive for incorporation of the device. Modification consisted of milling out the existing support structures in the drive for the recirculation filter, drilling a breather hole of ⅟16 inch diameter in the baseplate, and drilling two additional holes in the drive lid to allow introduction of contaminants and sampling of the internal drive atmosphere during performance testing. Each of the holes in the lid was covered with a stainless steel fitting (Part No. SS-200-7-4, Baltimore Valve and Fitting Co., Baltimore, Md.), which was centered over the hole and attached and sealed using two component epoxy. In addition, the electrical connection to the voice coil motor (VCM) was severed in order to keep the actuator in a fixed position during all tests. The drive was cleaned using isopropanol and clean, pressurized air to remove any oils and particulates created during modification. The head suspension assemblies were removed from the E-block prior to reassembly into the drive in order to eliminate the possibility of head crashes during testing.

Following modification of the drive, the filter device was mounted into the drive baseplate. The liner covering the adhesive on the bottom surface of the device was removed, and the device was pressed firmly onto the baseplate with the hole in the bottom adhesive located over the newly drilled breather hole in the drive. The disks were then clamped back onto the motor hub using the original spacer rings and clamping ring, and the actuator assembly was reassembled into the drive, including associated E-block, VCM and flex circuit components.

Disk Drive Breather Filter Test:

This test is designed to measure the effectiveness of a breather filter in reducing the particle concentration inside a disk drive when the drive is placed in an environment heavily laden with fine particles and air is forcibly drawn into the drive. The performance of the breather filter is quantified by an efficiency, which is the percentage reduction in particle concentration between the external and internal environments of the drive.

The device was tested in the modified disk drive, and the pre-existing breather hole in the drive was covered with metallized tape. The lid was fastened securely to the baseplate and tape was applied over the screw holes in the lid as well as along the periphery of the drive to seal off any extraneous leaks. A control drive, of the same model and also having had its head suspension assemblies removed, contained no breather filter. The pre-existing breather hole in the baseplate was left uncovered in the control drive to simulate an imperfectly sealed drive.

The drive was placed inside a stainless steel box. One of the two ports in the lid, that which was upstream of the filter device based on the direction of disk rotation, was capped to prevent airflow through the fitting. The downstream port was connected using a ⅛ inch outside diameter flexible tube to a port in the wall of the metal box, which was connected on the outside of the box via tubing to a laser particle counter (Model LAS-X, Particle Measuring Systems, Inc., Boulder, Colo.). Sample flow rate out of the drive and through the counter was maintained at 1 cc/sec and sheath flow through the LPC was maintained at 40 cc/sec. A second port in the wall of the metal box was connected to a 6 inch length of ¼ inch inner diameter flexible tubing opening onto the interior of the box. The line for sampling the atmosphere in the box was also connected to the laser particle counter (LPC). The two lines running from the box to the LPC were each connected to a length of flexible tubing passing through a solenoid valve which was electronically controlled to simultaneously close off one line while opening the second. Upon exiting the solenoid valve the two lines met in a 'Y' junction, allowing the LPC to sample one line at a time. A third port in the wall of metal box was used for the introduction of an aerosol into the internal environment of the box. The aerosol stream passed through a fitting in the port and then was divided into two streams, each of which flowed through a separate tube and entered the box through three gas dispersion tubes (Part Number P-06614-25, Cole-Parmer Instrument Company, Vernon Hills, Ill.). The aerosol consisted of an aqueous suspension of 0.1 μm and 0.3 μm diameter polystyrene latex (PSL) spheres (Catalog Number 5010A and 5030A, Duke Scientific Corporation, Palo Alto, Calif.) which provided an approximately 5:1 ratio of 0.1 μm to 0.3 μm particles as sampled from the metal box. Power to the drive was provided by an electrical connection through a fourth port through the wall of the metal box which was not seated tightly in order to provide a means for venting any overpressure from the box.

After the drive was placed in the box and the connections made for power and air sampling, a gasketed lid was clamped securely to the top of the box. Breather tests were performed with both the drive motor off and on. In the case of tests where the motor was on, proper motor function was tested prior to sealing the box, and then verified during testing by measuring the current through the electrical power wires using a current probe.

The breather filter test was performed as follows: The aerosol flow was turned on at the beginning of the test and remained on throughout the duration of the test. Initially the box was charged with particles for 120 seconds. Then the box was sampled for 180 seconds in order to allow the particle counts to stabilize, and during which time no data was recorded. Subsequently, the number of 0.1 μm and 0.3 μm particles from the box were counted and recorded every 5 seconds for 100 seconds. Next the drive was allowed to settle for 180 seconds and then sampled every 5 seconds for 100 seconds. The box and drive were monitored for two additional cycles in this same manner, each time allowing 180 seconds for stabilization of the counts and 100 seconds of sampling for both box and drive. Typical levels of the aerosol particles as sampled from the metal box were between 11500 and 18000 per 5 second interval for 0.1 μm particles and between 2200 and 3700 per 5 second interval for 0.3 μm particles.

The data was analyzed by obtaining the average counts for the box and the drive for each of the three cycles. The efficiency for each cycle was calculated using the following formula:

$$\%\text{Efficiency} = \{[\text{Average (Box)} - \text{Average (Drive)}] / \text{Average (Box)}\} * 100\%$$

The three efficiency values were then averaged together to obtain the overall breather filter efficiency. This analysis was performed separately for 0.1 μm and 0.3 μm particles. Data reported in the examples is for the 0.1 micron sized particles unless otherwise noted, as the efficiencies were similar for the two particle sizes and more 0.1 micron particles were present.

Disk Drive Recirculation Filter Test:

This test is designed to measure the effectiveness of a recirculation filter in reducing the particle concentration inside a disk drive from an initial state in which the drive has been charged with particles. The performance of the recirculation filter is quantified in terms of a cleanup time, which is the time required to reduce the particle counts to a fixed percentage of their initial value.

For testing the effectiveness of the recirculation filter function the device was tested in the modified disk drive. The existing breather hole in the drive was left uncovered in order to provide a means for venting any overpressure from the drive and to allow air to enter the drive during periods when the drive environment was being sampled without air being purposefully introduced into the drive. The lid was fastened securely to the baseplate. A tube supplying an aerosol mixture of 0.1 μm and 0.3 μm particles was connected to the port in the drive lid which was upstream of the device based on the direction of disk rotation. A second tube for sampling the internal atmosphere of the drive connected the laser particle counter (LPC) to the port in the drive lid which was downstream of the device. Sample flow rate out of the drive and through the counter was maintained at 1 cc/sec and sheath flow through the LPC was maintained at 40 cc/sec. Counts of 0.1 μm and 0.3 μm particles were obtained once per second by the LPC and stored on a computer disk drive for later analysis. The test was performed with the drive located in a laminar flow hood fitted with a HEPA filter in the air intake, in order to maintain a controlled test environment with an extremely low ambient particle concentration. A control drive, of the same model and also having had its head suspension assemblies removed, contained no recirculation filter.

The recirculation filter test consisted of the following sequence: With the drive powered on and clean air passing through the drive, the counts of 0.1 μm and 0.3 μm particles were monitored until a low background count was achieved, typically when 0.3 μm particles were less than 3 counts per second and 0.1 μm particles were less than 10 counts per second. At that time the aerosol was flowed into the drive in order to charge the internal environment with particles. When fully charged and stabilized, counts of 0.1 μm particles were typically between 10000 and 20000 per second and counts of 0.3 μm particles were typically between 3000 and 6500 per second. At this point the flow of aerosol into the drive was halted while sampling of the internal drive atmosphere continued, by drawing out of the drive air which entered through the open breather hole in the baseplate as well as any leaks in the lid or baseplate. The concentration of 0.1 μm and 0.3 μm particles was observed to drop over time due to the recirculation of air through the drive and the filter, impaction of the particles on surfaces inside the drive, and the gradual exchange of particle-laden air with clean air drawn in through the breather hole. Monitoring of the drive continued until the particle counts dropped to the initial background values observed prior to charging the drive with aerosol.

The data was analyzed by measuring the time required for the counts of 0.1 μm and 0.3 μm particles to fall to 0.1% of their value when the drive was fully charged with particles, defined as the cleanup time. Three individual tests were performed in order to check reproducibility and eliminate error from noise in the background counts. The results from the three tests were averaged to obtain the average cleanup times for 0.1 μm and 0.3 μm particles. Again, results reported are for 0.1 micron particles unless otherwise noted.

Disk Drive Adsorption Tests:

These tests are designed to measure the effectiveness of an adsorbent filter in reducing the concentration of a volatile organic contaminant, toluene, inside a disk drive relative to the concentration of toluene in an inlet stream flowing into the drive. The performance of the adsorbent filter is quantified by calculating the percentage of the inlet concentration of toluene detected in the drive vapor space.

The device was tested in the modified disk drive. In addition to the two ports made in the drive lid, a stainless steel fitting was also adhered and sealed over the breather hole to create a third port. Following these further modifications of the drive, the device was mounted into the baseplate as earlier described, such that the hole in the bottom adhesive was located over the breather hole specially made for testing the device. The pre-existing breather hole in the drive was covered with metallized tape. The remaining components were then reassembled into the drive. The drive was resealed, and adhesive tape was used to seal all potential paths for significant air leaks. A control drive of the same model which contained no adsorbent was also tested.

The drive motor was continuously spinning during all testing. The disk drive was purged with clean dry air to verify that initial toluene concentration was 0 ppm. One of the three ports into the drive was capped off, and a stream of air at a constant volumetric flow rate of 40 ml/min was flowed into one of the two other ports. The remaining port was connected to a flow meter to monitor for any flow loss. The outlet flow into the flow meter was measured to be at least 95% of the inlet stream, and thus the drive was considered adequately sealed for testing.

For testing adsorbent breather functionality, a room temperature stream of 25 ppm toluene in clean dry air was flowed directly into the part, through the fitting adhered to the breather hole, at a volumetric flow rate of 40 ml/min. One of the two ports in the lid was closed with a cap. Rigid TEFLON® tubing was used to connect the second port in the lid to a gas chromatograph equipped with a flame ionization detector (FID) to monitor toluene concentration inside the drive. The data were analyzed by calculating a percentage from the ratio of the sampled concentration and a nominal inlet concentration of 25 ppm over the duration of the test.

For testing the adsorbent recirculation functionality, a cap was used to seal the fitting entering the breather hole over which the device was situated. The pre-existing breather hole in the drive remained sealed with metallized tape. A room temperature stream of 25 ppm toluene in clean dry air was then flowed into the drive through the port in the lid which was upstream of the test sample, at a volumetric flow rate of 40 ml/min. The second port in the lid was connected to the FID with rigid TEFLON® tubing, in order to monitor toluene concentration inside the drive. The data was analyzed by calculating a percentage from the ratio of the sampled concentration and a nominal inlet concentration of 25 ppm over the duration of the test.

Passive Adsorption Test:

This test is designed to measure the initial adsorption uptake of a volatile organic contaminant, toluene, by an adsorbent filter under static conditions, i.e., adsorption under constant gas/vapor concentration without significant convective gas now. The performance of the adsorbent filter is quantified in terms of an adsorption rate, which is the average weight increase of the adsorbent filter per unit time.

For measuring the passive adsorption uptake, the device was adhered to a small sheet of plastic which covered the entire bottom surface, such that the entrance to the diffusion tube was completely sealed off. A small hole had been punched in a portion of the plastic sheet protruding out from under the device, which was used to suspend the device from a hook attached to the microbalance. The glass sample chamber was sealed around the device. Water from a constant temperature bath was circulated through a jacket surrounding the sample chamber until the system reached a steady temperature of 25° C. The chamber was then flushed with clean dry air until the microbalance recorded a constant weight, signifying the elimination of moisture from the device.

To start the vapor adsorption process, the microbalance was tared, and the toluene/air gas mixture was allowed to flow through the chamber at a flow rate of 1 liter/min and a concentration of 25 ppm by volume. Based on this volumetric flow rate and the cross-sectional area of the sample chamber, the linear flow velocity was calculated to be around 0.9 mm/second. This should be sufficiently low to prevent convective flow through the device which might have a significant impact on the adsorption rate. The weight of the device was monitored for several hours and recorded using a computer-based data acquisition system. The data was analyzed by performing a linear regression through the weight data for the device vs. time. The resulting slope provides a measure of the passive adsorption rate of the device.

Frazier Number Air Permeability Test:

Air permeability was measured by clamping a test sample in a circular gasketed flanged fixture 5.5 inches in diameter (23.76 square inches in area). The upstream side of the sample fixture was connected to a flow meter in line with a source of dry compressed air. The downstream side of the sample fixture was open to the atmosphere.

Testing was accomplished by applying an air pressure of 0.5 inches of water to the upstream side of the sample and recording the flow rate of air passing through the in-line flow meter (a ball-float rotameter).

Results are reported in terms of Frazier Number which has units of cubic feet/minute/square foot of sample at 0.5 inches of water pressure.

Without intending to limit the scope of the present invention, the following examples illustrate how the present invention may be made and used.

A 3.5" computer hard disk drive was modified with an air cavity 30 as depicted in FIG. 2. The samples were tested in accordance to the procedures previously outlined.

EXAMPLE 1

A sample was made up to test the recirculation filter functionality without any adsorbents in the recirculation portion of the filter. It was made as shown in FIG. 4 with a layer of double-sided adhesive tape comprising two layers 0.001" thick (0.025 mm) of permanent high temperature, low outgassing, acrylic pressure sensitive adhesive on both sides of a two mil polyester film carrier as layer 41. The diffusion tube hole 45 was cut into this layer 41 to mate one end to the hole through the drive baseplate. Layer 42 was then superimposed over layer 41. Layer 42 was a single sided adhesive tape comprising a layer of 0.001" (0.025 mm) thick permanent high temperature, low outgassing, acrylic pressure sensitive adhesive on a 0.002" (0.051 mm) thick polyester carrier. Hole 48 was cut through layer 42 near the end of hole 45 opposite the location of alignment with the hole in the drive baseplate. Holes 46 were cut through layers 41 and 42. Layer 43 was a carbon adsorbent layer, but it only covered holes 45 and 48 and did not extend down to cover hole 46. A carbon material commercially available from American Kynol, Inc., under the part number ACC5092-15 was used. Layer 44 was a PTFE membrane made in accordance with U.S. Pat. No. 3,953,566 with a Frazier number of 18 and a 0.1 micron sized particle filtration efficiency of 97%.

Figure 12:
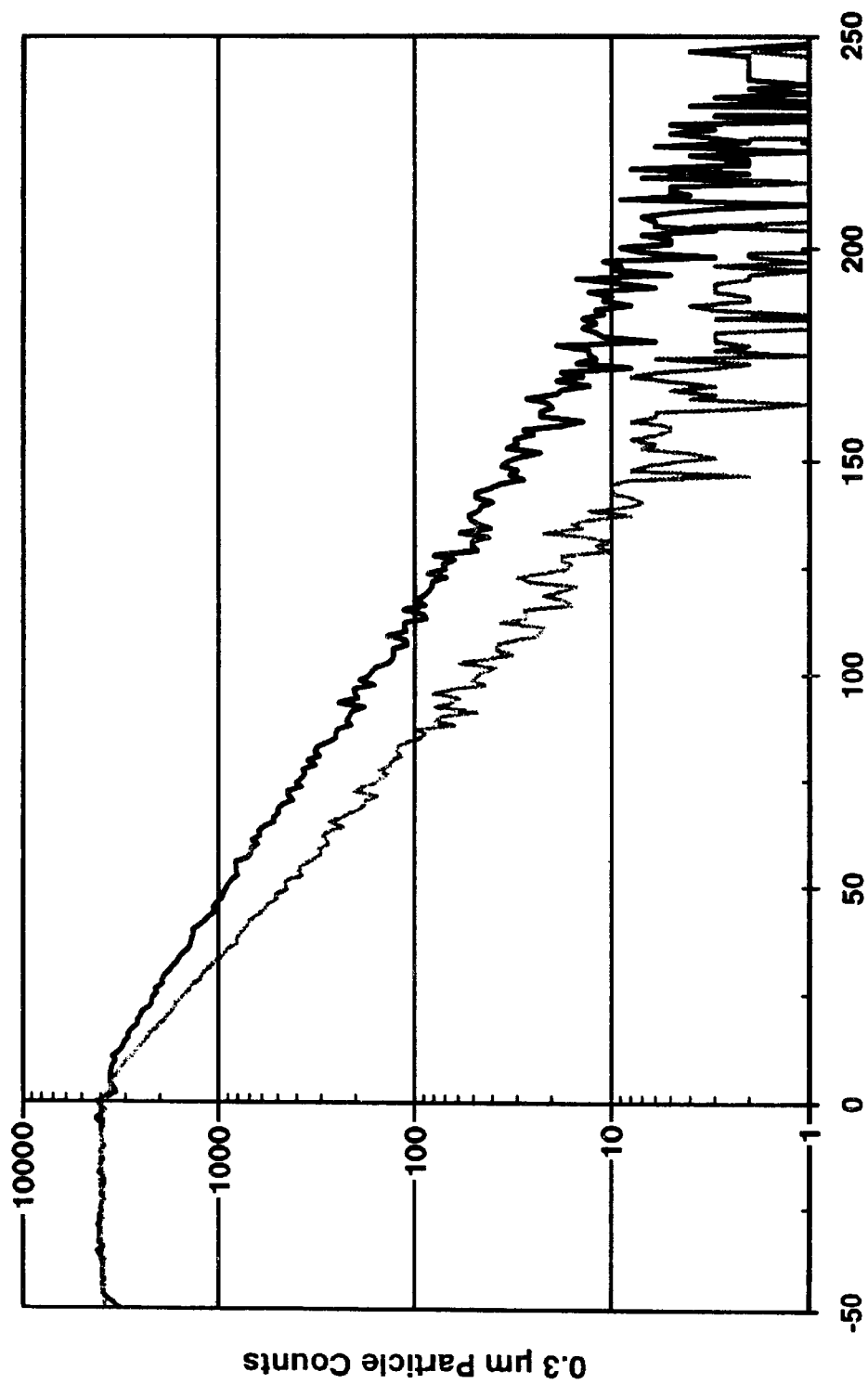
FIG. 12 shows performance data in accordance with Example 1.

The filter was put in place, over a recess such that the airflow is similar to that of path 32 in FIG. 3, on the drive housing and tested for particle cleanup as previously described. Without the filter, the drive cleaned up in times of 203, 198, and 200 seconds in three repetitive runs. With the filter, it cleaned up in 142, 147, and 140 seconds in three repetitive runs, which is about 28.5% faster. An example of the output data for a run with and without the filter is shown in FIG. 12, with the no filter line being the upper line. It should be recognized that the filtration performance can be optimized for a particular disk drive by appropriate choice of filter materials, size and location, ramp design and location, and cavity size and location. Moreover, optimization can be different for each drive since they differ in number of disks, rotational speed, and even direction of rotation.

EXAMPLE 2

A second sample was made up to test the recirculation, breather, adsorbent breather, adsorbent recirculation and the organic collection filtration functionalities of the filter. It was made as shown in FIG. 4 and with the same materials as Example 1, except the adsorbent layer 43 now covered both holes 46 as well as 45 and 48 to cover both the recirculation and breather functions.

Figure 13:
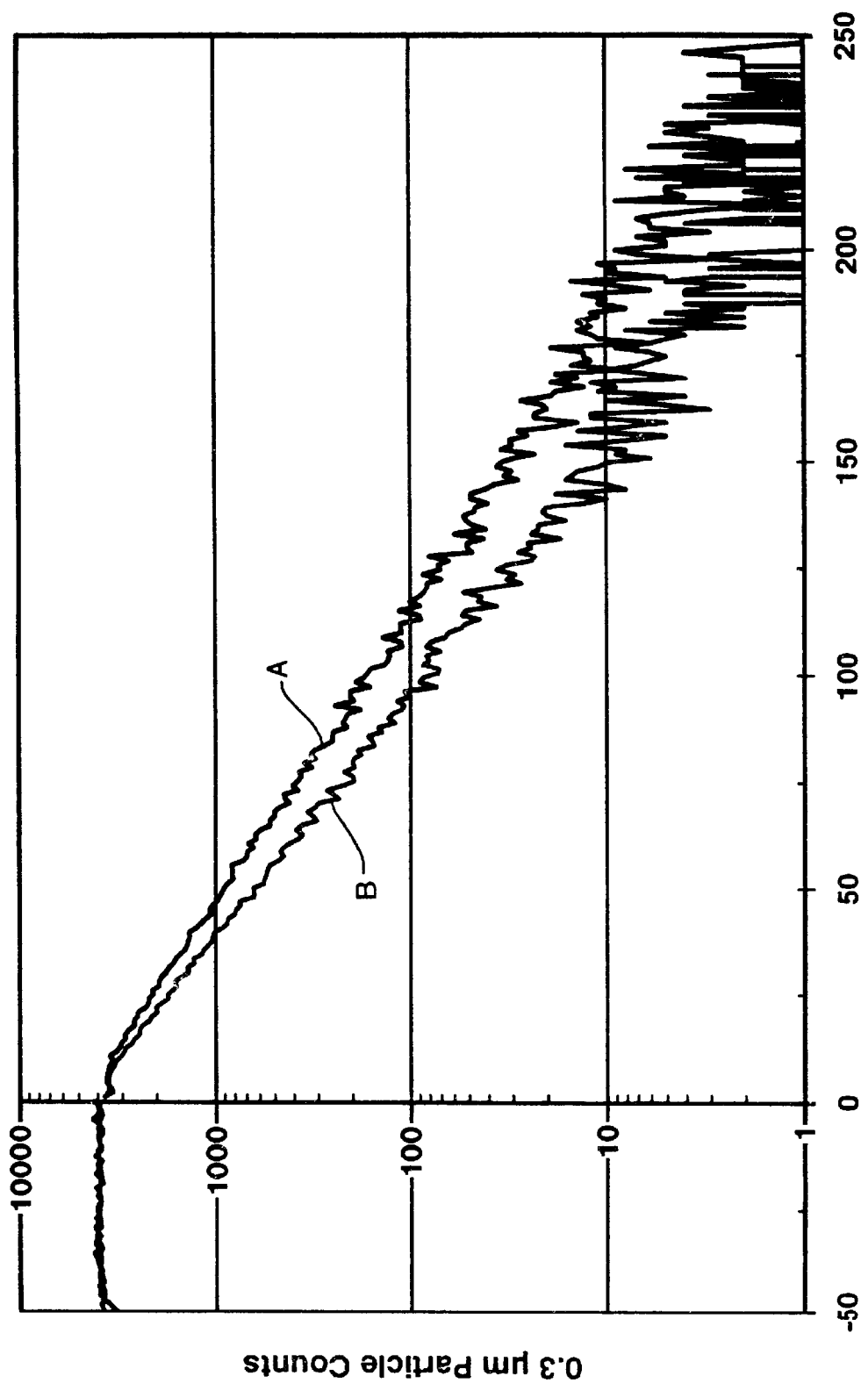
FIGS. 13–17 show performance data in accordance with Example 2.

Again the recirculation functionality was tested. Without the filter the drive again cleaned up in 203, 198, and 200 seconds and with the filter it cleaned up in 162, 161, and 176 seconds, which is 14.9% faster. An example of the output data for the run with and without the data is shown in FIG. 13, again with the no filter line being the upper line.

The breather filter functionality was also tested as previously described in the Disk Drive Breather Filter Test. It was tested both with the drive running (both breather filter and recirculation filter functioning) and not running when mostly the breather filter alone was functioning. The following results in Table 1 were obtained for three repetitive runs at each condition with the averages and %cleanup efficiencies calculated:

TABLE 1

| | Drive off | | | Drive on | | |
|---|---|---|---|---|---|---|
| | Box | Drive | % Cleaner | Box | Drive | % Cleaner |
| With ramp | 15,962 | 876 | | 12,583 | 195 | |
| | 15,811 | 923 | | 12,858 | 184 | |
| | 15,321 | 950 | | 13,170 | 241 | |
| Average | 15,698 | 916 | 94.2 | 12,870 | 207 | 98.4 |
| Without ramp | 11,739 | 597 | | 15,462 | 206 | |
| | 11,837 | 724 | | 15,946 | 228 | |
| | 11,443 | 655 | | 15,133 | 257 | |
| Average | 11,673 | 659 | 94.4 | 15,514 | 230 | 98.5 |

This illustrates the breather filter functions well and the combination recirculation filter and breather filter (drive on condition) performs better than either filter alone.

Figure 14:
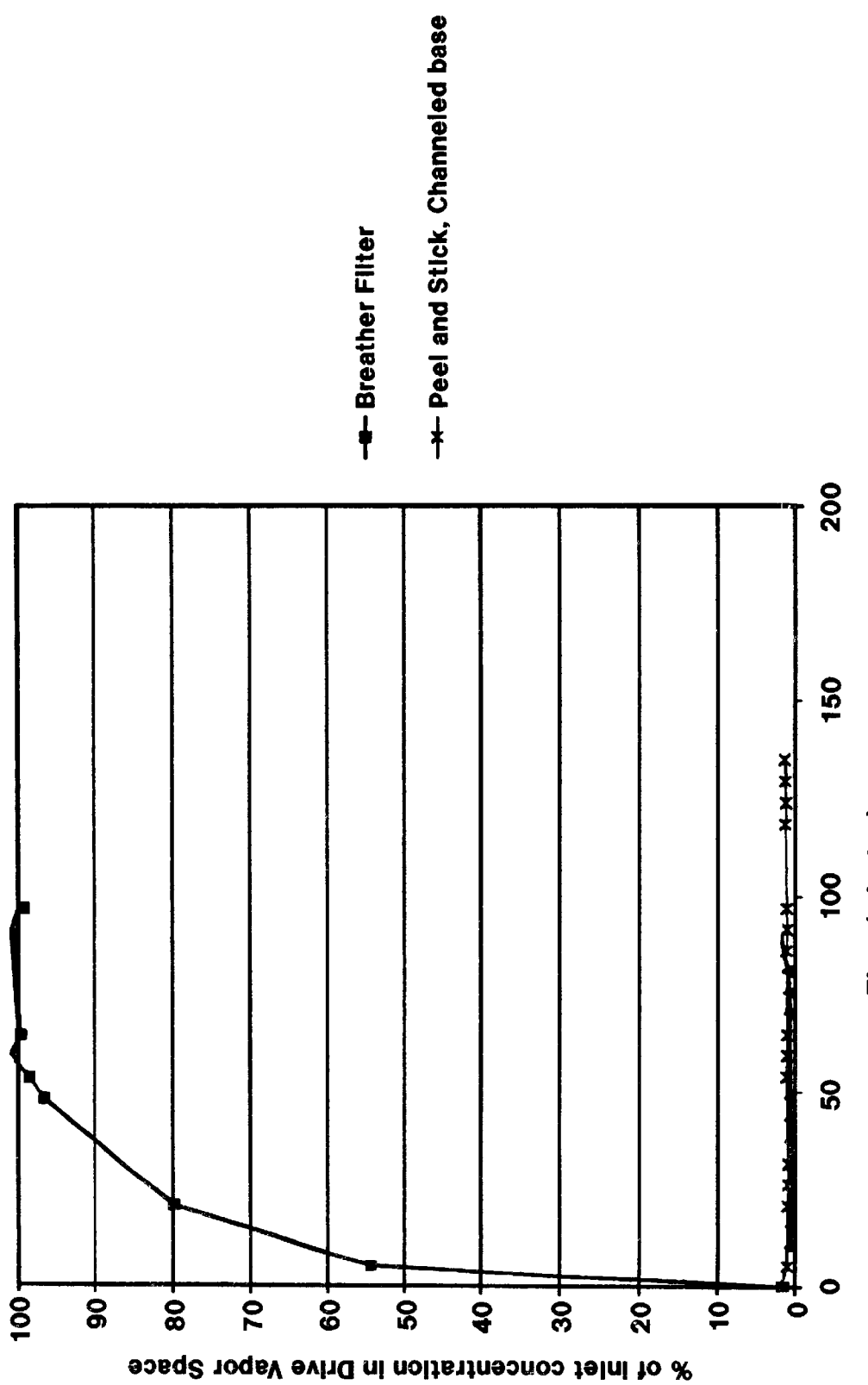
Figure 15:
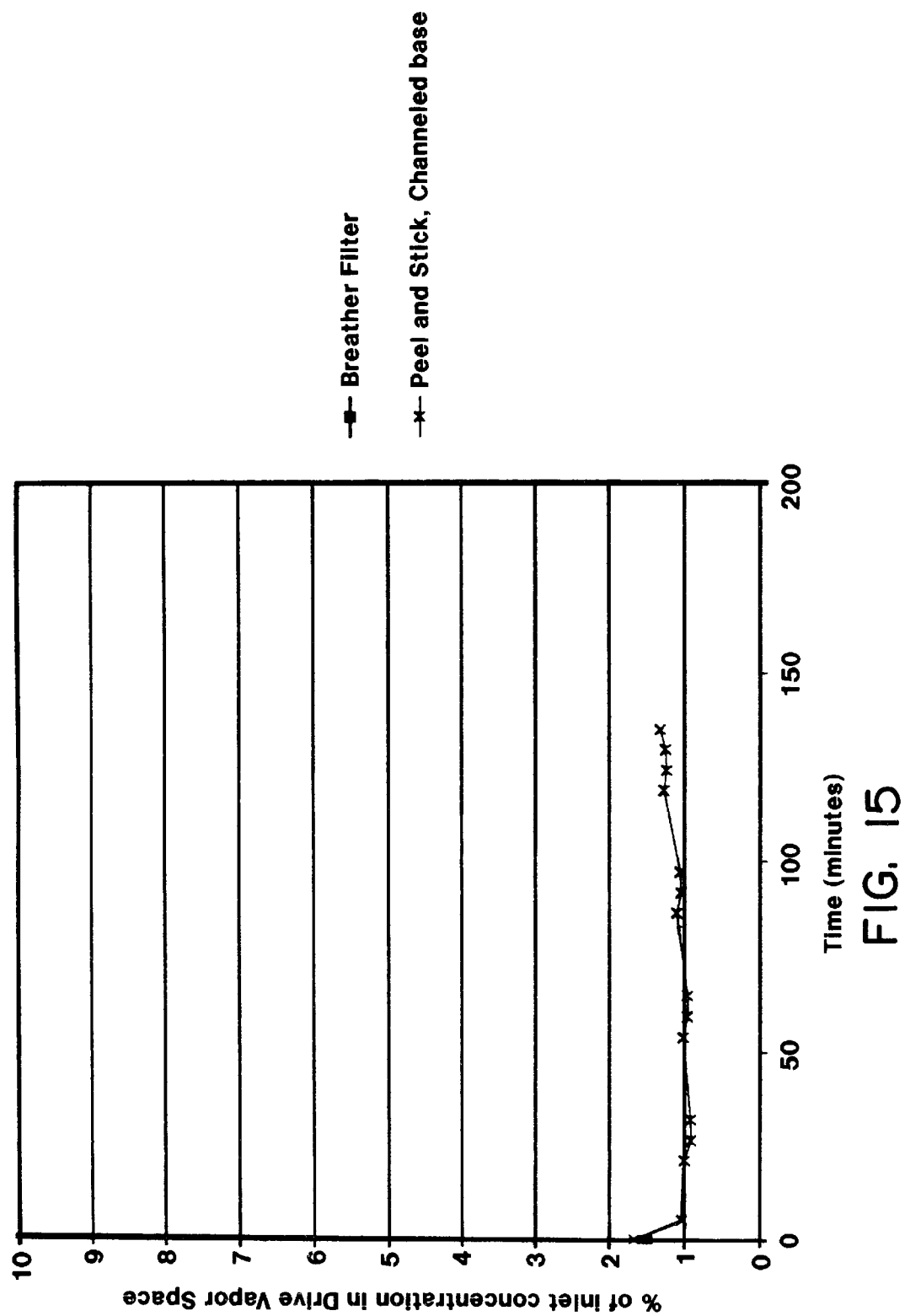

The organic adsorption functionality in the adsorbent breather filter section was then tested as previously described by forcing air with 25 ppm of toluene through the adsorbent breather filter (or no filter for comparison). The result is shown in FIG. 14 plotting the current invention vs a standard particulate breather filter, illustrating that the adsorbent breather filter of the current invention is adsorbing the toluene and keeping the drive clean. FIG. 15 is a blowup of the beginning of the test showing that the adsorbent breather is adsorbing about 99% of the toluene in the incoming air.

Figure 16:
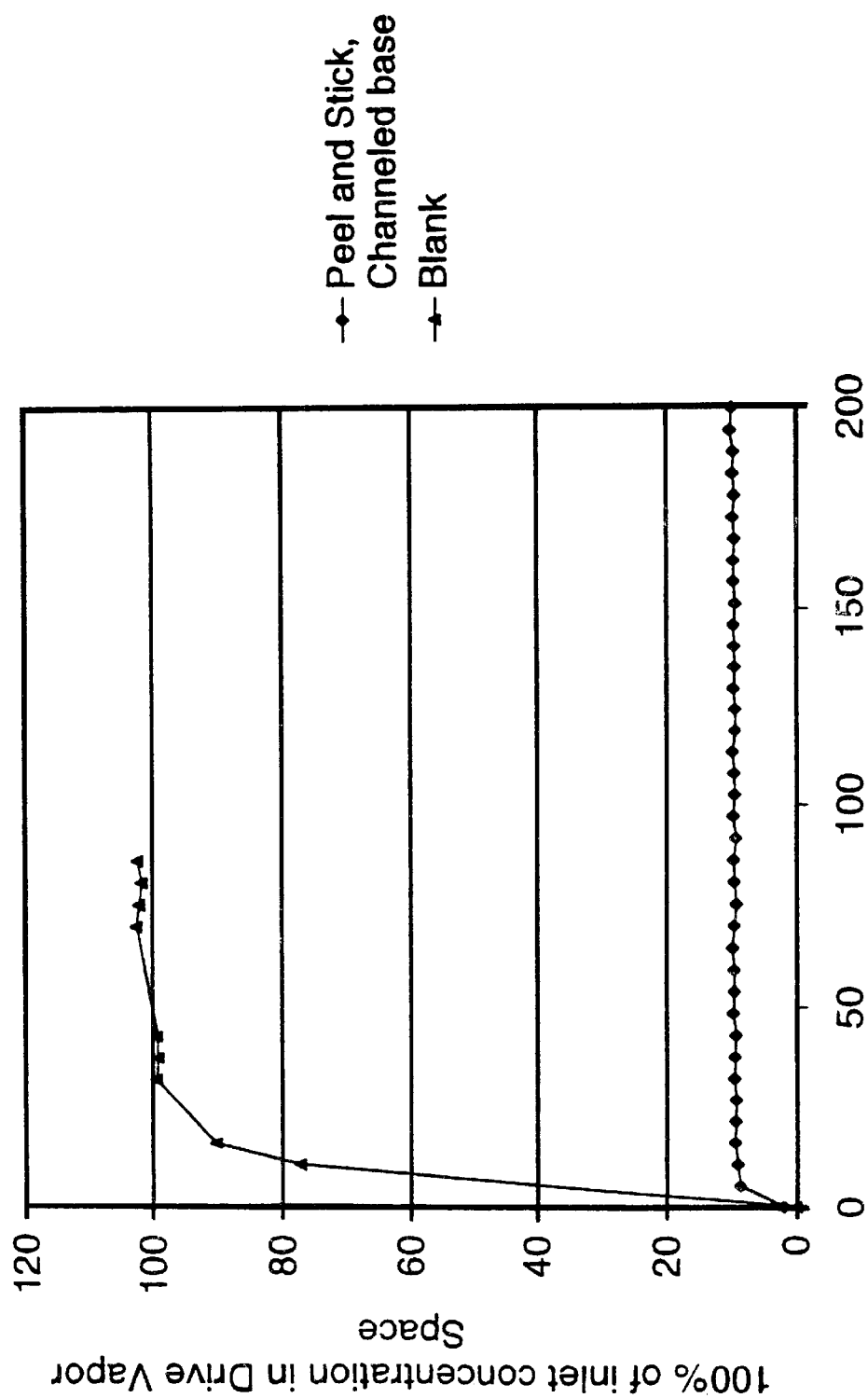

The organic adsorbtion functionality in the adsorbent recirculation filter section was then tested as previously described by loading the drive with a steady stream of toluene laden air and sampling the drive when running with and without the filter. The result is shown in FIG. 16 illustrating that the adsorbent recirculation filter is adsorbing the toluene and keeping the drive about 90% cleaner.

Figure 17:
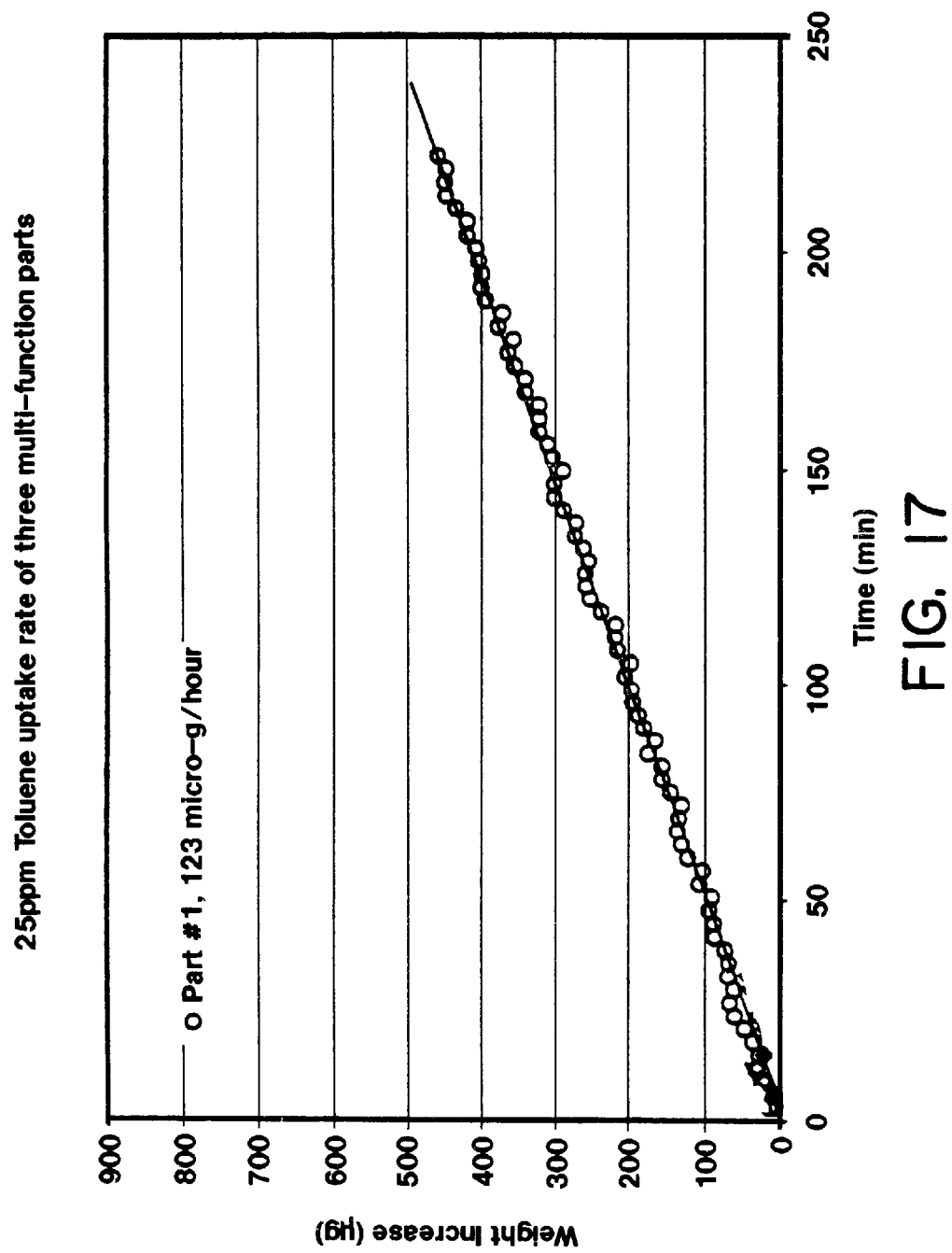

The filter was further tested in a passive organic adsorbtion mode as previously described in the Passive Adsorption Test. FIG. 17 graphs the weight gain per unit time illustrating that the filter works in a passive mode and will continue to adsorb contaminants outgassing from the internal drive components in a passive or at-rest (non-operating) state.

EXAMPLE 3

A third example was made to test the breather and recirculation filtration functionality of another embodiment of the present invention as illustrated in FIG. 5. Adhesive layer 51 is the same as layer 41 in Example 1. A second layer to form a diffusion tube was not used. A filtration membrane layer 52, like 44 used in Example 1 was placed over the breather outlet hole to provide high filtration efficiency for the breather section. Layers 53 and 58 of an electret filtration material with accompanying polyester nonwoven scrim respectively, typically used in recirculation filters in disk drives and available in finished filter form from W. L. Gore and Associates, Inc., as GORE-TRET® recirculation filters, where the finished filter air permeabilities are typically 200 to 500 Frazier, and the electrostatic material permeability alone is typically 350 to 1000 Frazier, was superimposed over layers 52 and 51 as illustrated in FIG. 5. Superimposed over layer 53 was a polyethylene scrim layer 54, available from Delnet Inc, under the part number Delnet 0707, with an air permeability of about 700 to 800 Frazier, again as illustrated in FIG. 5.

Figure 18:
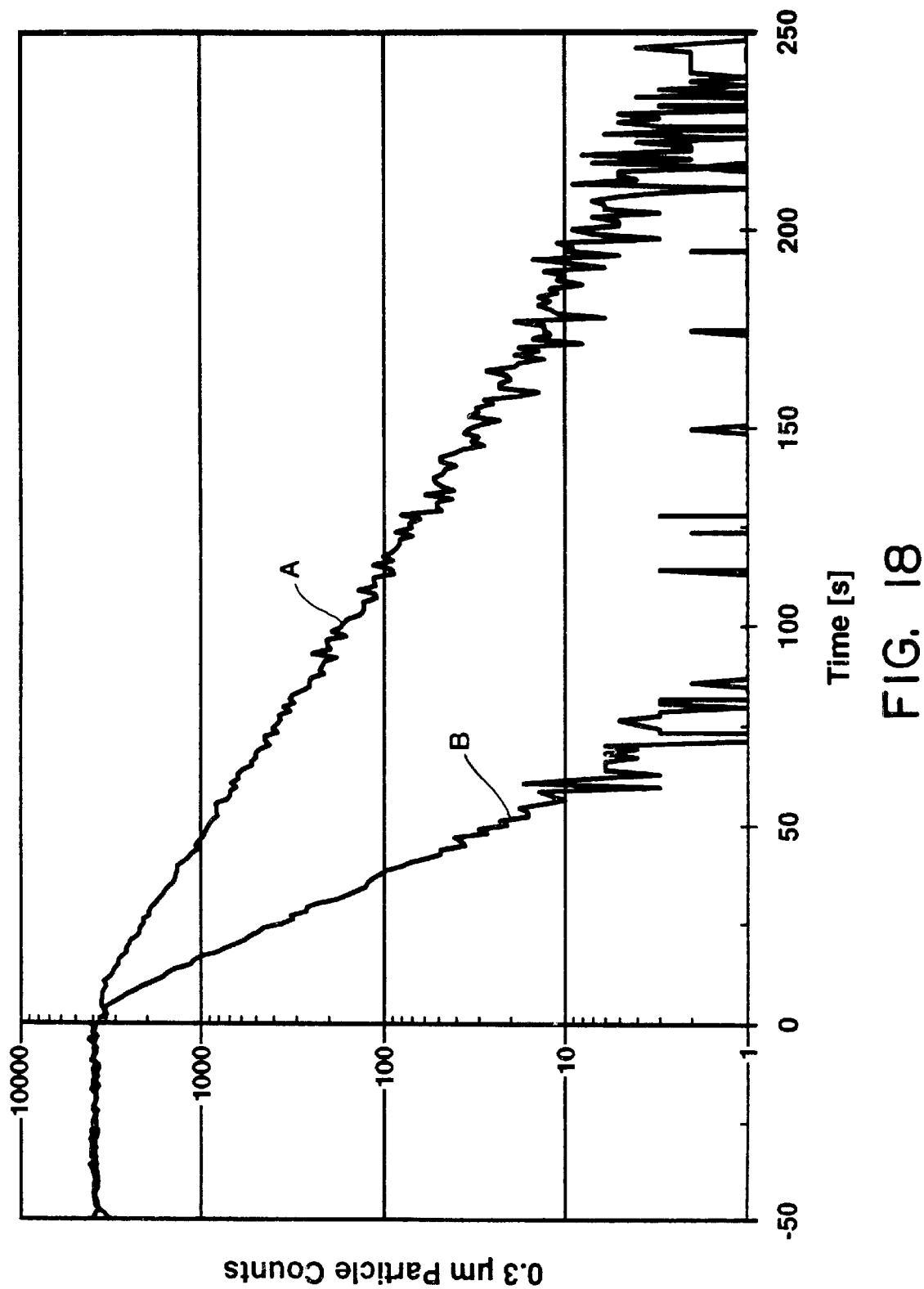
FIG. 18 shows performance data in accordance with Example 3.

The filter was tested for recirculation filter functionality as previously described. Without the filter the drive cleaned up in 203, 198, and 200 seconds and with the filter the drive cleaned up in 60, 68, and 67 seconds or 66.7% faster. Further the drive was tested with the existing recirculation filter in place and cleanup times of 80, 72, and 77 seconds were obtained. An example of the output data for the run with and without the filter is shown in FIG. 18.

The filter was also tested for breather filter functionality with the drive both on and off with the following results for three replicate tests along with the averages and % drive cleanup:

| | Drive on | | | Drive off | | |
|---|---|---|---|---|---|---|
| | Box | Drive | % Cleaner | Box | Drive | % Cleaner |
| | 12,599 | 2 | | 9,611 | 8 | |
| | 13,612 | 1 | | 10,895 | 7 | |
| | 13,307 | 1 | | 10,991 | 10 | |
| Average | 13,172 | 1 | 99.99 | 10,499 | 8 | 99.92 |

This illustrates the breather filter function was working extremely well.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. A disk drive filter assembly for selectively removing contaminants from a disk drive enclosure comprising:
    a layer of adhesive having at least one opening therein, each of said at least opening defined by a perimeter, for location over a breather hole in said enclosure;

a first filter layer having an air permeability of from 0.05 to 40 Frazier and a particle filtration efficiency of at least 90% for 0.1 micron sized particles adjacent said adhesive layer and covering said at least one opening; and a second filter layer having an air permeability of from 18 to 1000 Frazier and a particle filtration efficiency of at least 55% for 0.1 micron sized particles adjacent said first filtration layer.

2. The assembly of claim 1, wherein the permeability of the first filter layer is from 0.1 to 7 Frazier with an efficiency of at least 97% for 0.1 micron sized particles.

3. The assembly of claim 1, wherein the permeability of the second filter layer is from 60 to 250 Frazier.

4. The assembly of claim 1, wherein the permeability of the first filter layer is from 0.1 to 7 Frazier and the permeability of the second filter layer is from 60 to 250 Frazier.

5. The assembly of claim 1, further comprising an adsorbent within said assembly.

6. The assembly of claim 5, wherein the adsorbent comprises a physisorber made from a material selected from the group consisting of silica gel, activated carbon, activated alumina, molecular sieves, clays and superabsorbent fibers.

7. The assembly of claim 5, wherein the adsorbent comprises a chemisorbent made from a material selected from the group consisting of calcium carbonate, calcium sulfate, potassium permanganate, sodium carbonate, potassium carbonate, sodium phosphate and activated metals.

8. The assembly of claim 5, wherein the adsorbent comprises a polymeric scaffold that is impregnated with an adsorbent.

9. The assembly of claim 8, wherein the polymeric scaffold is selected from the group consisting of membranes of polypropylene, polyethylene, polyvinylidene fluoride, polyvinyl alcohol, poly(ethylene terepthalate) and other polymers capable of creating a membrane having a microstructure of nodes and fibrils.

10. The assembly of claim 8, wherein the polymeric scaffold comprises expanded polytetrafluoroethylene.

11. The assembly of claim 1, wherein said adhesive layer further included a diffusion tube.

12. The assembly of claim 1, wherein the adhesive comprises a double-sided adhesive of non-particulating permanent acrylic adhesive coated on a carrier.

13. The assembly of claim 1, wherein the first filter layer is selected from polypropylene, nylon, a composite of polycarbonate and polyester, mixed cellulose ester, polyvinyl chloride and cellulose triacetate.

14. The assembly of claim 1, wherein the first filter layer comprises expanded polytetrafluoroethylene.

15. The assembly of claim 1, wherein said second filter layer comprises an electret material.

16. The assembly of claim 1, further comprising a gasket adhered to at least a portion of said filter assembly.

17. The assembly of claim 1, further comprising at least one outer layer comprising at least one material selected from the group consisting of a scrim, a woven and a nonwoven material adjacent the second filter layer.

18. A disk drive filter assembly for selectively removing contaminants from a disk drive enclosure comprising:

a layer of adhesive having at least one opening therein, each of said at least opening defined by a perimeter, for location over a breather hole in said enclosure;

a filter layer having a particle filtration efficiency of at least 97% for 0.1 micron sized particles adjacent said adhesive layer and covering said at least one opening;

an electret filter layer comprising a fibrous electret material bonded to a support material and located adjacent said filter layer; and an outer layer which constrains protruding fibers from the adjacent electret filter layer.

19. The assembly of claim 18, further comprising an adsorbent material within said assembly.

20. The assembly of claim 19, wherein the adsorbent comprises a physisorber made from a material selected from the group consisting of silica gel, activated carbon, activated alumina, molecular sieves, clays and superabsorbent fibers.

21. The assembly of claim 19, wherein the adsorbent comprises a chemisorbent made from a material selected from the group consisting of calcium carbonate, calcium sulfate, potassium permanganate, sodium carbonate, potassium carbonate, sodium phosphate and activated metals.

22. The assembly of claim 19, wherein the adsorbent comprises a polymeric scaffold that is impregnated with an adsorbent.

23. The assembly of claim 22, wherein the polymeric scaffold is selected from the group consisting of membranes of polypropylene, polyethylene, polyvinylidene fluoride, polyvinyl alcohol, poly(ethylene terepthalate) and other polymers capable of creating a membrane having a microstructure of nodes and fibrils.

24. The assembly of claim 22, wherein the scaffold is expanded polytetrafluoroethylene.

25. The assembly of claim 18, wherein the adhesive comprises a double-sided adhesive of non-particulating permanent acrylic adhesive coated on a carrier.

26. The assembly of claim 18, wherein said adhesive layer further includes a diffusion tube.

27. The assembly of claim 18, wherein said filter layer is selected from polypropylene, nylon, a composite of polycarbonate and polyester, mixed cellulose ester, polyvinyl chloride and cellulose triacetate.

28. The assembly of claim 18, wherein said filter layer comprises expanded polytetrafluoroethylene.

29. The assembly of claim 18, wherein said fibrous electret material comprises an electrically charged blend of expanded porous polytetrafluoroethylene fibers and polyamide fibers.

30. The assembly of claim 18, wherein said outer layer comprises a material selected from the group consisting of a scrim, a woven and a nonwoven material.

\* \* \* \* \*